(12) United States Patent
Mangu et al.

(10) Patent No.: US 11,257,256 B2
(45) Date of Patent: Feb. 22, 2022

(54) RASTER IMAGE TRACING

(71) Applicant: Adobe Inc., San Jose, CA (US)

(72) Inventors: Shashidhar Mangu, Bangalore (IN); Priyanka Channabasappa Herur, Bengaluru (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/875,003

(22) Filed: May 15, 2020

(65) Prior Publication Data
US 2021/0357113 A1 Nov. 18, 2021

(51) Int. Cl.
*G06T 9/20* (2006.01)
*G06F 3/04883* (2022.01)
*G06F 3/04842* (2022.01)
*G06T 11/20* (2006.01)
*G06T 11/60* (2006.01)

(52) U.S. Cl.
CPC ............ *G06T 9/20* (2013.01); *G06F 3/04842* (2013.01); *G06F 3/04883* (2013.01); *G06T 11/20* (2013.01); *G06T 11/60* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 5,361,333 | A * | 11/1994 | Ahlquist, Jr. | G06T 11/203 345/442 |
| 5,673,371 | A * | 9/1997 | Koopman | G06K 15/02 345/467 |
| 10,930,033 | B1 * | 2/2021 | Peterson | G06F 3/04842 |
| 11,068,739 | B1 * | 7/2021 | Ducrocq | G06T 7/13 |
| 2009/0282109 | A1 * | 11/2009 | Lyle | H04L 67/14 709/206 |
| 2019/0371008 | A1 * | 12/2019 | Peterson | G06T 7/13 |

OTHER PUBLICATIONS

"Canny edge detector", retrieved from the Internet: https://en.wikipedia.org/wiki/Canny_edge_detector, downloaded May 15, 2020, 8 pages.

* cited by examiner

*Primary Examiner* — Sarah Le
(74) *Attorney, Agent, or Firm* — Finch & Maloney PLLC

(57) ABSTRACT

Techniques are disclosed for tracing a vector image over at least a part of a raster image. One or more edges of the raster image (e.g., bitmap or photograph) are identified, and an edge model is generated. The edge model is a vector image including a plurality of Bezier curves that overlap with the edges of the raster image. One or more user inputs are received, which identify a first and second path point on the edge model. A subset of the plurality of Bezier curves that are between the first and second path points and on the edge model are selected. The subset of the plurality of Bezier curves are displayed, without displaying Bezier curves that are not within the subset. In an example, the subset of the Bezier curves traces edges of a section of the raster image between the first and second path points.

20 Claims, 18 Drawing Sheets

320a

```
┌─────────────────────────────────────────────────────────────────────┐ ┌─ 320a1
│ Receive the user input indicating the initiation of the user gesture for the trace │
│ operation, the user input being initiated from a gesture point that is not on any │
│                         Bezier path                                 │
└─────────────────────────────────────────────────────────────────────┘
                                    │
                                    ▼                        ┌─ 320a2
┌─────────────────────────────────────────────────────────────────────┐
│ Project the gesture point 424 on nearby Bezier paths, such that a projection │
│ distance between the gesture point 424 and the Bezier path 412a is Da, and a │
│ projection distance between the gesture point 424 and the Bezier path 412b is │
│              Db, and so on (e.g., see Fig. 4E1)                     │
└─────────────────────────────────────────────────────────────────────┘
                                    │
                                    ▼                        ┌─ 320a3
┌─────────────────────────────────────────────────────────────────────┐
│      Identify a distance that is lowest among the projection distances │
└─────────────────────────────────────────────────────────────────────┘
                                    │
                                    ▼                        ┌─ 320a4
┌─────────────────────────────────────────────────────────────────────┐
│ Identify the corresponding Bezier path (to which the projection distance is │
│ lowest) as the primary Bezier path, and identify the point of projection on the │
│                   primary Bezier path as a path point               │
└─────────────────────────────────────────────────────────────────────┘
```

Detect a user gesture being initiated at a gesture point 424 that does not lie on any edge of the raster image 400

For each Bezier path[i], where i = 1, ..., N, where N is a total number of Bezier paths, calculate Distance $D_i$, where $D_i$ is a closest distance between the gesture point 424 and a Bezier path[i].
Thus, distances D1, D2, ..., DN are calculated.

Identify $D_{min}$, which is a minimum of the distances D1, D2, ..., DN.

If, for example, distance Dm is identified to be the $D_{min}$, then designate Bezier path[m] as the primary Bezier path, and designate the point on the Bezier path[m] closest to the gesture point 424 as the path point 426

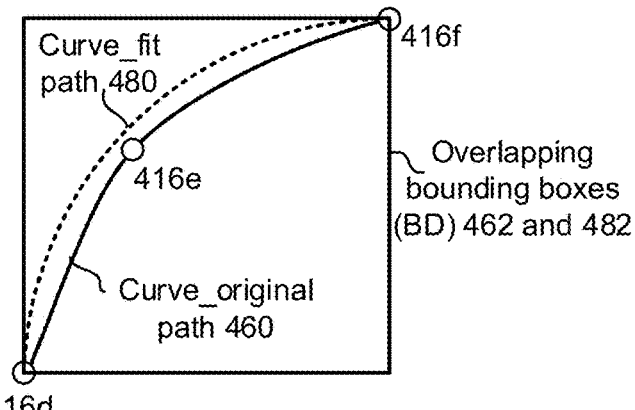
FIG. 4M1
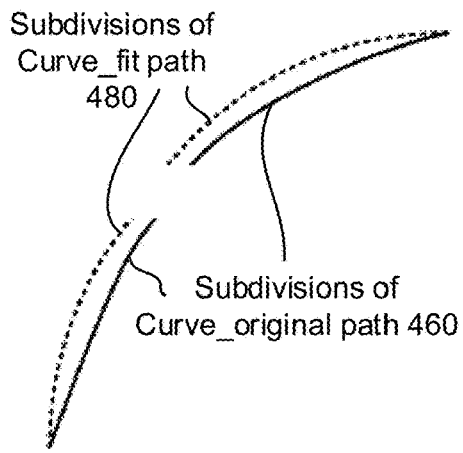
FIG. 4M2a
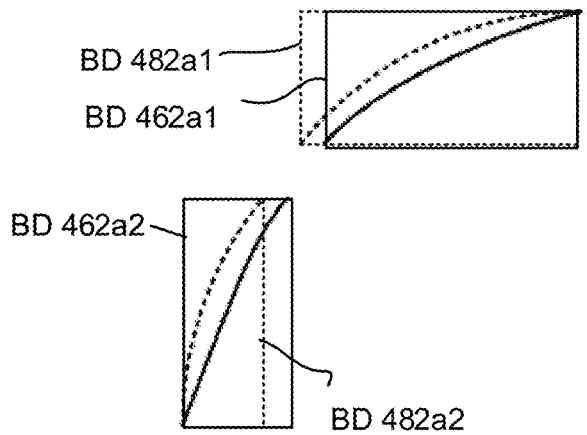
FIG. 4M2b
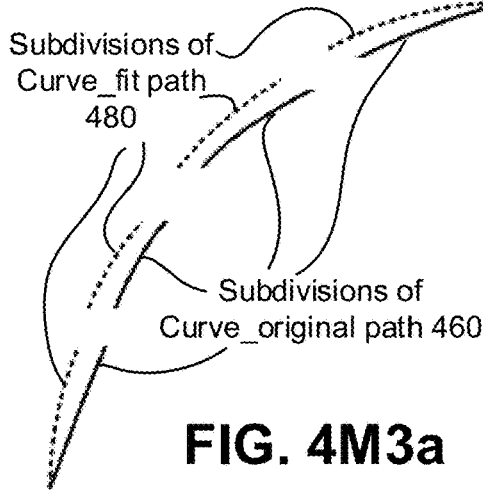
FIG. 4M3a
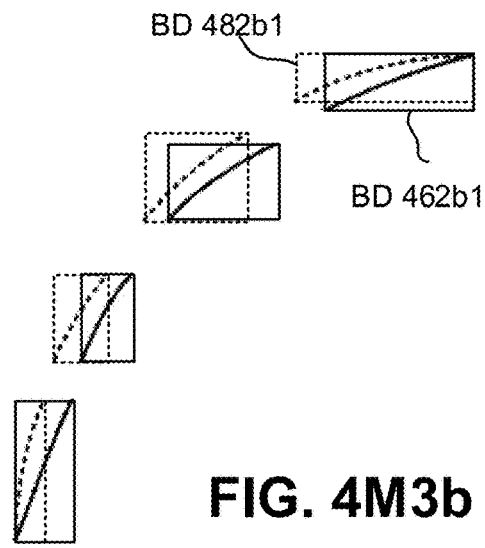
FIG. 4M3b

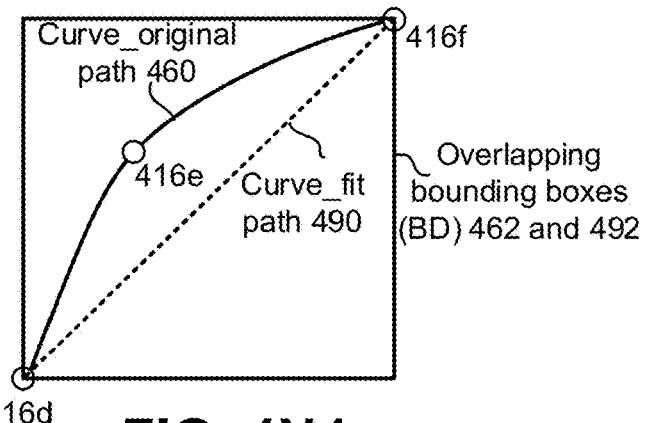
FIG. 4N1
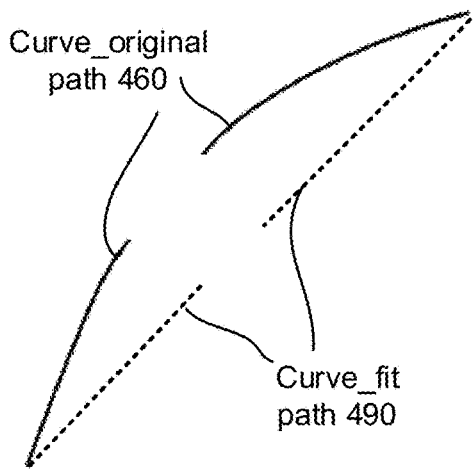
FIG. 4N2a
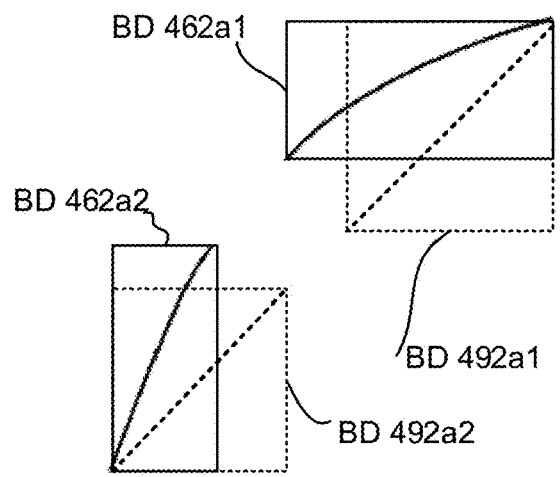
FIG. 4N2b
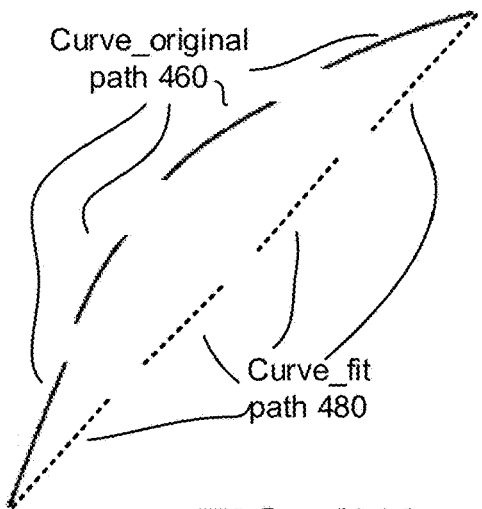
FIG. 4N3a
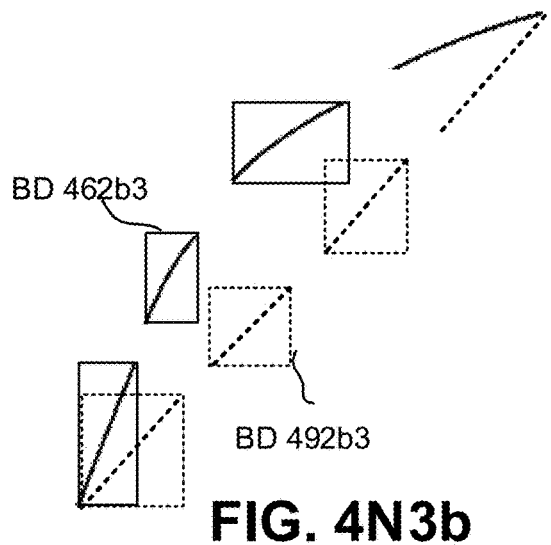
FIG. 4N3b

RASTER IMAGE TRACING

FIELD OF THE DISCLOSURE

This disclosure relates generally to image processing, and more specifically to tracing edges of raster images.

BACKGROUND

Designers usually sketch on paper while making concepts, and such sketches are digitalized to generate corresponding raster images. Other examples of raster images include digital photographs and frames of video. Sometimes, a user may want to trace over a reference raster image, such as a sketch or a photograph. For example, such tracing can be used to convert the raster image to a corresponding vector image. The main difference between a raster image and a vector image is that a raster image is composed of pixels, while a vector image is composed of points on a grid that are represented by mathematical formulas. Unlike raster images which are constrained to a given resolution, vector images can infinitely scale in size without losing resolution. So there are some benefits to using vector images rather than raster images. Example raster images include gif, png, bmp, and jpeg files, and example vector images include pdf, svg, eps, and AI (Adobe Illustrator) files. In any case, and as will be explained herein in turn, there are a number of non-trivial issues associated with tracing a raster image, to generate a corresponding vector image.

BRIEF DESCRIPTION OF THE DRAWINGS

FIG. 3B1 is a flowchart illustrating an example method to identify a path point and a primary Bezier path associated with an initiation of a user gesture, where an initial user-provided gesture point is not on any Bezier path, in accordance with some embodiments of the present disclosure.

FIG. 3B2 illustrates example pseudo code that corresponds to at least some of the operations of the example method of FIG. 3B1, in accordance with some embodiments of the present disclosure.

FIGS. 4A, 4B, 4C, 4D, 4E, 4E1, 4F, 4F1, 4G, 4H, 4I, 4J, 4K, 4L, 4M1, 4M2a, 4M2b, 4M3a, 4M3b, 4N1, 4N2a, 4N2b, 4N3a, 4N3b, 4O, 4P, and 4Q illustrate various example use cases associated with tracing a raster image, in accordance with some embodiments of the present disclosure.

DETAILED DESCRIPTION

Figure 1:
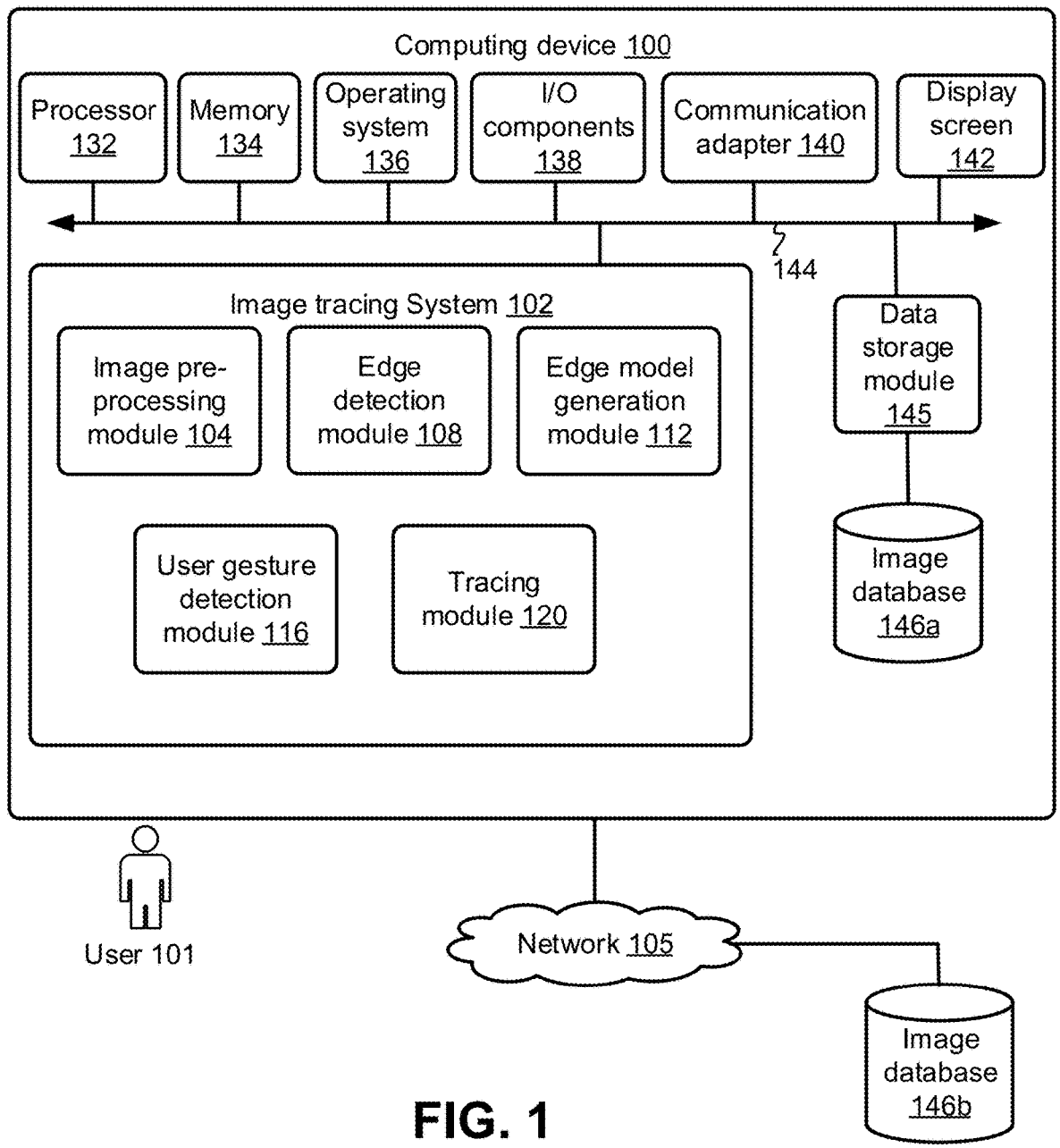
FIG. 1 is a block diagram schematically illustrating selected components of an example computing device configured to trace a raster image to generate a vector image, in accordance with some embodiments of the present disclosure.

Techniques are disclosed for tracing a vector image over at least a part of a raster image. In some embodiments, the discussed tracing techniques provide full control to the user in selecting sections of the raster image to be traced, and yet, the actual tracing operation is performed automatically. For example, in some embodiments, the user identifies a start point and an end point on the raster image for the trace. The actual tracing operation between the start point and the end point is automatic, and is carried out with no or minimal further user input.

In some embodiments, one or more edges of a raster image is identified. An edge model comprising a vector image is generated, where the vector image includes a plurality of Bezier curves that overlap with the one or more corresponding edges of the raster image. A first user input is received indicating an initiation of a user gesture for a trace operation, where the user gesture is initiated from a first gesture point on the raster image. In some such embodiments, a first path point on the edge model that is closer to the first gesture point than one or more other points on the edge model is identified. A second user input is received indicating a termination of the user gesture for the trace operation, where the user gesture is terminated on a second gesture point. In some embodiments, a second path point on the edge model that is closer to the second gesture point than one or more other points on the edge model is identified. A subset of the plurality of Bezier curves that are between the first and second path points are then identified. In some embodiments, the Bezier curves in the subset can be simplified, by opportunistically combining two or more Bezier curves into a single curve, provided an error due to such combination is less than a threshold. In some embodiments, the subset of the plurality of Bezier curves is displayed, without displaying one or more Bezier curves that are not within the subset. In an example such embodiment, the subset of the plurality of Bezier curves effectively traces or otherwise corresponds to the edges of at least a section of the raster image between the first and second path points. Numerous embodiments and variations will be apparent in light of this disclosure.

General Overview

As previously noted, there are a number of non-trivial issues associated with tracing a raster image, to generate a corresponding vector image. In more detail, given a raster image, a user may want to trace at least a part of the raster image to generate a corresponding vector image. For example, the generated vector image may include one or more Bezier curves, each of which overlaps with a corresponding one of the raster image edges. One existing technique to trace a raster image comprises automated tracing, where once the user provides the trace command, the computer system traces the entire raster image without requiring further user input. However, in such automated tracing, the user has no control over sections of the raster image the user desires to be traced, and sections of the raster image the user do not want to be traced. Another existing technique to trace a raster image comprises manual tracing, where the user has to manually perform the trace operation, such as by moving the cursor manually over entirety of sections of the edges that are to be traced, e.g., using a pen tool or a trace tool. The system can smoothen the trace path, if necessary, as the user continues tracing manually. This necessitates additional burden on the user and is time consuming, as the user has to move the tool over every section of every edge of the raster image the user wants to be traced. In yet another existing technique to trace a raster image, the computing system generates multiple overlapping geometric shapes corresponding to the raster image, and the user has to review such shapes to select optimal ones for tracing the raster image. This requires substantial cleanup effort on the part of the user, and is also time consuming. Thus, such existing techniques are either fully automated thereby providing relatively less control of the tracing operation to the user, or are insufficiently automated thereby providing relatively too much control to the user and requiring substantial time and effort on the part of the user for the tracing operation.

Thus, the tracing techniques discussed herein provide a desirable level of control to the user, but are sufficiently automated so as to require less effort and time on the part of the user. For example, in some embodiments, the user identifies a start point and an end point on the raster image for the trace. The actual tracing operation between the start point and the end point is automatic, and can be carried out without further user input. This provides the user an opportunity to control an important aspect of tracing—i.e., selecting a section of the raster image to trace, while the actual tracing is automated and does not require the user to manually move a tracing tool over every edge of the raster image. According to some such embodiments, an image tracing system automatically traces one or more edges of the raster image between the start point and the end point using a plurality of Bezier curves. During the automated portion, the Bezier curves in the traced path can be simplified, by opportunistically combining two or more Bezier curves into a single curve, provided an error due to such combination is less than a threshold.

In further detail, the image tracing system accesses a raster image and causes display of the raster image on a display screen. The raster image can be, for example, a sketch, a photograph, a video frame, a scanned document such as a bitmap, or any other type of raster image. In some embodiments, the raster image comprises one or more objects that are at least in part disjoint or detached, as will be discussed herein in turn. The objects are detached or disjoint in the sense that edges of these objects do not overlap with each other in the raster image.

In some embodiments, an image pre-processing module of the image tracing system is programmed or otherwise configured to preprocess the raster image to, for example, adjust brightness and contrast of the image, reduce noise within the image, apply Gaussian blur to improve edge detection, and/or any apply appropriate pre-processing techniques employed to pre-process a raster image. An edge detection module of the image tracing system is programmed or otherwise configured to detect one or more edges of one or more objects within the raster image. The edge detection can be performed using any number of existing edge detection algorithms, such as, for example, the Canny edge detector.

In some such embodiments, an edge model generation module of the image tracing system is programmed or otherwise configured to generate an edge model comprising a vector image, based on the detected edges of objects of the raster image. For example, the edge model overlaps the edges of the raster image, as will be discussed in turn. In some embodiments, the edge model includes one or more Bezier paths, where each Bezier path includes one or more Bezier curves that correspond to various object edges of the raster image. In some embodiments, the edge model generation module, in the process of generating the edge model, also defines or identifies a plurality of edge points of the various Bezier curves. For example, assume there are three different objects in the raster image. The edge model, in such an example, will include three different Bezier paths, with each Bezier path including one or more Bezier curves and overlapping with edges of a corresponding object of the raster image. Note that the edge model including the various Bezier paths and Bezier curves are not displayed yet to the user—the user can merely view the raster image on the display screen.

The user can select sections of the edges of the raster image that the user desires to be traced. For example, the user performs a user gesture, such as a tap-and-hold gesture or a drag gesture on a touch sensitive display screen, or performs a press-and-hold gesture or a click-and-hold gesture using an input device, such as a computer mouse or a trackpad, or performs multiple clicks or taps, as will be discussed in turn. When the user initiates the user gesture, the cursor is at a first gesture point on the raster image. When the user terminates the user gesture, the cursor is at a second gesture point on the raster image. Thus, the user gesture identifies two gesture points on the raster image, and the user wants edges of the raster image between the two gesture points to be traced. In some embodiments, a user gesture detection module of the image tracing system is programmed or otherwise configured to detect the user-provided gesture points, so that the system can then automatically traces edges of the raster image between those gesture points.

In some example use cases, the first gesture point can be over an edge of the raster image. For example, whenever the cursor hovers on or near (e.g., within a threshold distance) an edge of the raster image prior to initiation of the user gesture, the image tracing system snaps the cursor to the edge. In such an example, the first gesture point will be on the edge of the raster image. Similarly, the user can terminate the user gesture on an edge of the raster image due to the snapping action, and the second gesture point will also be on the edge of the raster image. In such example use cases where the first and second gesture points are on edges of the raster image, the first and second gesture points are respectively referred to as first and second path points.

However, in some other use cases (e.g., where the snapping action is disabled or otherwise not performed), the first gesture point and the second gesture point can be offset with respect to the edges of the raster image. For example, the first gesture point can be near one or more edges, but not exactly on any edge. In some such cases, the first gesture point is projected on nearby Bezier paths. For example, a projection distance between the first gesture point and a first Bezier path is a shortest distance between the first gesture point and the first Bezier path. If multiple Bezier paths are nearby, corresponding multiple projection distances are calculated. A projection distance that is lowest among such multiple project distances is identified. A Bezier path corresponding to the lowest projection distance is referred to as a primary Bezier path, and a corresponding projection point on the primary Bezier path is referred to as a first path point. Thus, the first path point is a point on a Bezier path that is closest to the first gesture point, compared to any other points on any other Bezier paths. Similarly, a point on a Bezier path that is closest to the second gesture point is referred to as a second path point. Thus, the first and second path points are projection of the first and second gesture points on the corresponding nearest Bezier paths.

Note that in some use cases, both the first and second path points are on the same Bezier path, which is the primary Bezier path. This is because at least some of the Bezier paths are disjoint, and if the first and second path points were on different Bezier paths, tracing from the first path point to the second path point would not have been possible, as discussed herein in detail in turn.

In any such cases, once the first and second path points are identified, a tracing module of the image tracing system is programmed or otherwise configured to initiate the process of tracing edges of the raster images between the two path points. For example, the image tracing system identifies one or more possible trace paths on the primary Bezier path between the two path points, and selects a trace path from the one or more possible trace paths. A trace path generally refers to a possible path on the primary Bezier path to reach from the first path point to the second path point. The selection of the trace path can depend on one or more criteria. For instance, a length of each of the trace path on the primary Bezier path is determined, and the trace path with the smallest length is selected. In another example, a manner or direction in which the user moves the cursor while traveling from first path point to the second path point is taken into account to select the trace path, as will be discussed in turn. In some embodiments, the tracing module then identifies a subset of the plurality of Bezier curves that represent the selected trace path.

In some embodiments, the tracing module may opportunistically reduce the number of Bezier curves in the subset, by combining two or more Bezier curves within the subset into a single Bezier curve. For example, the tracing module determines an error between the single Bezier curve and the two or more Bezier curves. If the error is less than a threshold, the tracing module performs the combination operation. In some such embodiments, to determine the error between the single Bezier curve and the two or more Bezier curves, the tracing module forms an original curve (referred to as curve_original) comprising the two or more Bezier curves, and forms a combination curve (referred to as curve_fit) comprising the single Bezier curve. The tracing module then divides each of the curve_original and curve_fit into multiple subdivisions. Thus, each subdivision of the curve_original will have a corresponding subdivision of the curve_fit, as will be discussed in detail in turn. The tracing module draws a bounding box on each subdivision of each of the curve_original and curve_fit. A bounding box of a curve is a rectangle having two opposite ends overlapping with corresponding two ends of the curve. If a bounding box of each subdivision of the curve_original intersects with a corresponding bounding box of a corresponding subdivision of the curve_fit, this implies high similarity between the curve_fit and the curve_original (e.g., error between the two curves in less than a threshold value). Accordingly, the tracing module replaces the two or more Bezier curves of the curve_original with the single Bezier curve of the curve_fit, thereby simplifying the subset of curves representing the selected trace path. In some embodiments, subsequently, the tracing module causes display of the subset of the plurality of Bezier curves, without displaying one or more Bezier curves that are not within the subset. For example, only the Bezier curves, which are between first and second path points and over the selected trace path, are displayed.

Thus, the user is able to select only a section of the edges of the raster image, and the tracing between the first and second path points is done automatically by the image tracing system. Numerous variations and embodiments will be appreciated in light of this disclosure.

System Architecture

FIG. 1 is a block diagram schematically illustrating selected components of an example computing device 100 (also referred to as device 100) configured to trace a raster image to generate a vector image, in accordance with some embodiments of the present disclosure. As can be seen, the device 100 includes an image tracing system 102 (also referred to as system 102) that allows the device 100 to trace a raster image to generate a vector image, based on relatively simple input from the user. As will be appreciated, the configuration of the device 100 may vary from one embodiment to the next. To this end, the discussion herein will focus more on aspects of the device 100 that are related to tracing a raster image, and less so on standard componentry and functionality typical of computing devices.

The device 100 comprises, for example, a computer, a laptop, a desktop, a tablet computer, a smartphone, and/or any other computing device that can trace a raster image to generate a vector image, as further explained herein. In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, a display screen 142, data storage module 145, and the system 102. A bus and/or interconnect 144 is also provided to allow for inter- and intra-device communications using, for example, communication adaptor 140. Note that in an example, components like the operating system 136 and the system 102 can be software modules that are stored in memory 134 and executable by the processor 132. In another example, one or more modules of the system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually takes place over a physical bus structure or via software calls, request/response constructs, or any other such inter and intra component interface technologies, as will be appreciated.

In an example, the communication adaptor 140 of the device 100 can be implemented using any appropriate network chip or chipset allowing for wired or wireless connection to network 105 and/or other computing devices and/or resources. To this end, the device 100 is coupled to the network 105 via the adaptor 140 to allow for communications with other computing devices and resources, such as a remote image database 146*b*. The network 105 is any suitable network over which the computing devices communicate. For example, network 105 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In an example, the device 100 has access to the local image database 146a and/or a remote image database 146b, any one of both of which stores the raster image that is to be traced and/or the resultant traced vector image. In an example, the remote database 146b is a cloud-based database, where the device 100 can access the database 146b over the network 105. The document database 146a is coupled to the data storage module 145, which facilitates read and write access to database 146a.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. The device 100 also includes one or more I/O components 138, such as one or more of a tactile keyboard, a touch sensitive or a touch-screen display (such as the display 142), a mouse, a trackpad, a microphone, a camera, scanner, and location services. In general, other standard computer system componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

As can be further seen, the image tracing system 102 comprises an image pre-processing module 104, an edge detection module 108, an edge model generation module 112, a user gesture detection module 116, and a tracing module 120. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In some embodiments, the system 102 receives a raster image, and causes display of the raster image on the display screen 142. The image pre-processing module 104 pre-processes the raster image, e.g., to reduce noise and blur, to facilitate detection of edges within the raster image. In some embodiments, the edge detection module 108 detects edges of one or more objects within the raster image. The edge model generation module 112 generates an edge model, which is a vector image comprising a plurality of Bezier curves representing the edges of the raster image. In some embodiments, once the edge model is generated, a user, such as the user 101 illustrated in FIG. 1, can selectively trace an entirety or merely a part of the edges of the raster image. For example, one or more user inputs are received by the user gesture detection module 116, which identify, for a trace operation, a starting point and a termination point on one or more edges of the raster image. In some embodiments, the starting point and a termination point are mapped to the underlying edge model, and sections of the edge model comprising one or more Bezier curves between the starting point and the termination point are identified by the tracing module 120. In some embodiments, the tracing module 120 can opportunistically simply the identified one or more Bezier curves, prior to the Bezier curves being displayed. For example, the tracing module 120 combines two or more Bezier curves into a single Bezier curve, if an error due to such combination is less than a threshold. The tracing module 120 then causes display of the identified Bezier curves, thereby completing the tracing between the starting point and the termination point. The user 101 can extend the tracing by selecting another starting point and termination point, and the tracing can be likewise extended between the new starting point and termination point. Each of the components of the system 102 will be discussed in further detail herein in turn.

Thus, as discussed, the system 102 allows the user 101 to select one or more sections of edges of the raster image for tracing. Once selected, tracing on the selected sections are automatically performed by the system 102.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the system 102 may be implemented in any application that allows digital image processing and displaying.

Figure 2:
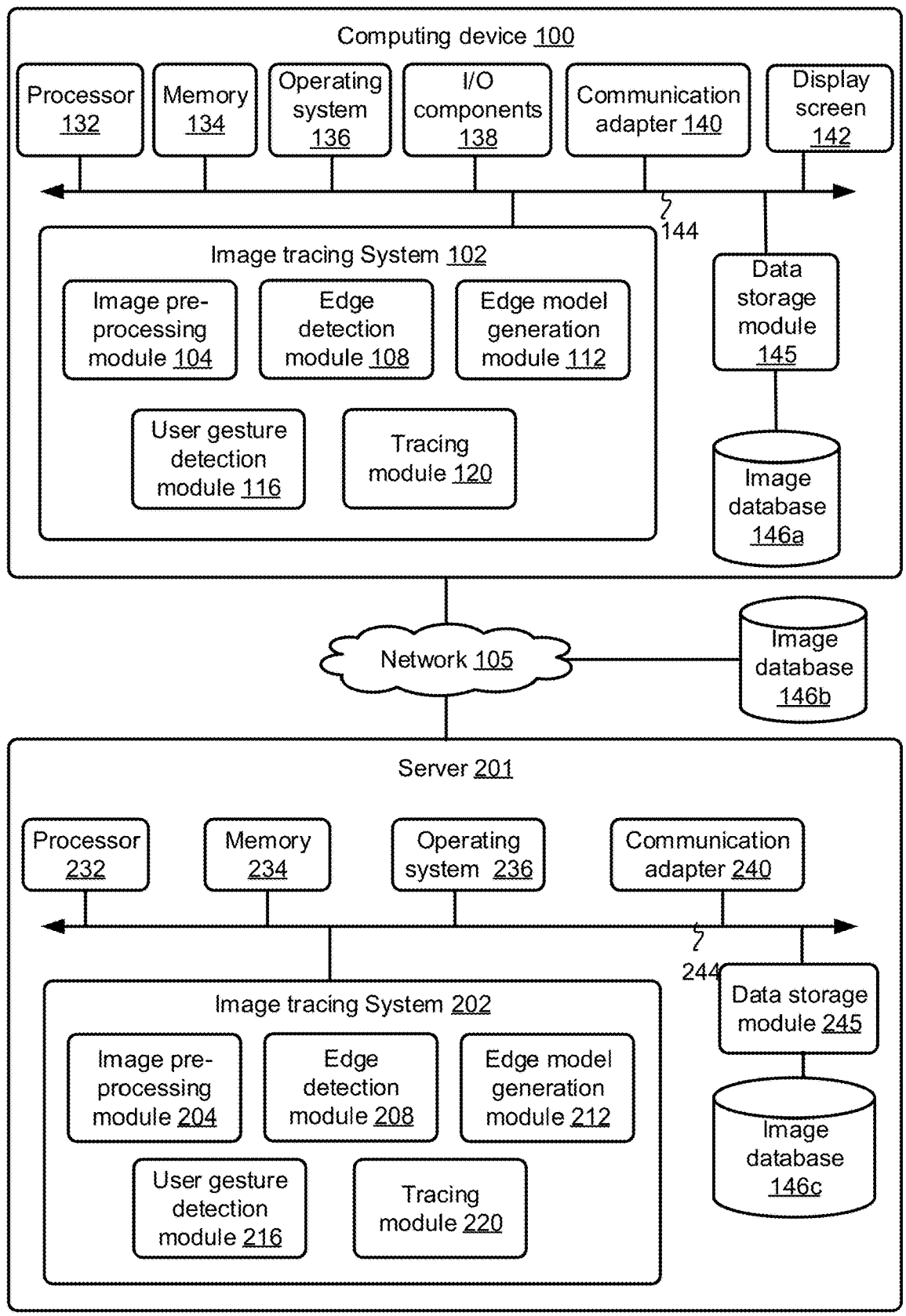
FIG. 2 is a block diagram schematically illustrating selected components of an example system comprising the computing device of FIG. 1 communicating with server device(s), where the combination of the computing device and the server device(s) are configured to trace a raster image to generate a vector image, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to trace a raster image to generate a vector image, in accordance with some embodiments of the present disclosure.

In an example, the communication adaptor 140 of the device 100 can be implemented using any appropriate network chip or chipset allowing for wired or wireless connection to network 105 and/or other computing devices and/or resources. To this end, the device 100 is coupled to the network 105 via the adaptor 140 to allow for communications with other computing devices and resources, such as the server 201 and the image database 146b.

In one embodiment, the server 201 comprises one or more enterprise class devices configured to provide a range of services invoked to provide tracing of raster images, as variously described herein. Although one server 201 implementation of the image tracing system is illustrated in FIG. 2, it will be appreciated that, in general, tens, hundreds, thousands, or more such servers can be used to manage an even larger number of the raster images, and tracing thereof.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an image tracing system 202 (also referred to as system 202), data storage module 245, and a communication adaptor 240. An image database 146c (e.g., that comprises a non-transitory computer memory) comprises the raster images to be trace and/or the traced vector images, and is coupled to the data storage module 245. A bus and/or interconnect 244 is also provided to allow for inter- and intra-device communications using, for example, communication adaptor 240 and/or network 205. Note that components like the operating system 236 and system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, process, store, receive, and transmit any type of digital images, such as processing and/or tracing of raster images. The system 202 comprises an image pre-processing module 204, an edge detection module 208, an edge model generation module 212, a user gesture detection module 216, and a tracing module 220, each of which can be similar to the corresponding components within the system 102 of the device 100, as discussed with respect to FIG. 1.

In some embodiments, the location of some functional modules in the system 202 may vary from one embodiment to the next. Any number of client-server configurations will be apparent in light of this disclosure. In still other embodiments, the techniques may be implemented entirely on a user computer, e.g., simply as stand-alone user marking sharing application. Similarly, while the image pre-processing module 104 is shown on the client side in an example case, it may be on the server side in other embodiments, such as the cloud-based image pre-processing module 204. In an example, the image database can be local or remote to the systems 102, 102, so long as it is accessible by the image tracing system that is implemented by the system 102 and/or implemented by the system 202.

Methodology and Operation

Figure 3A:
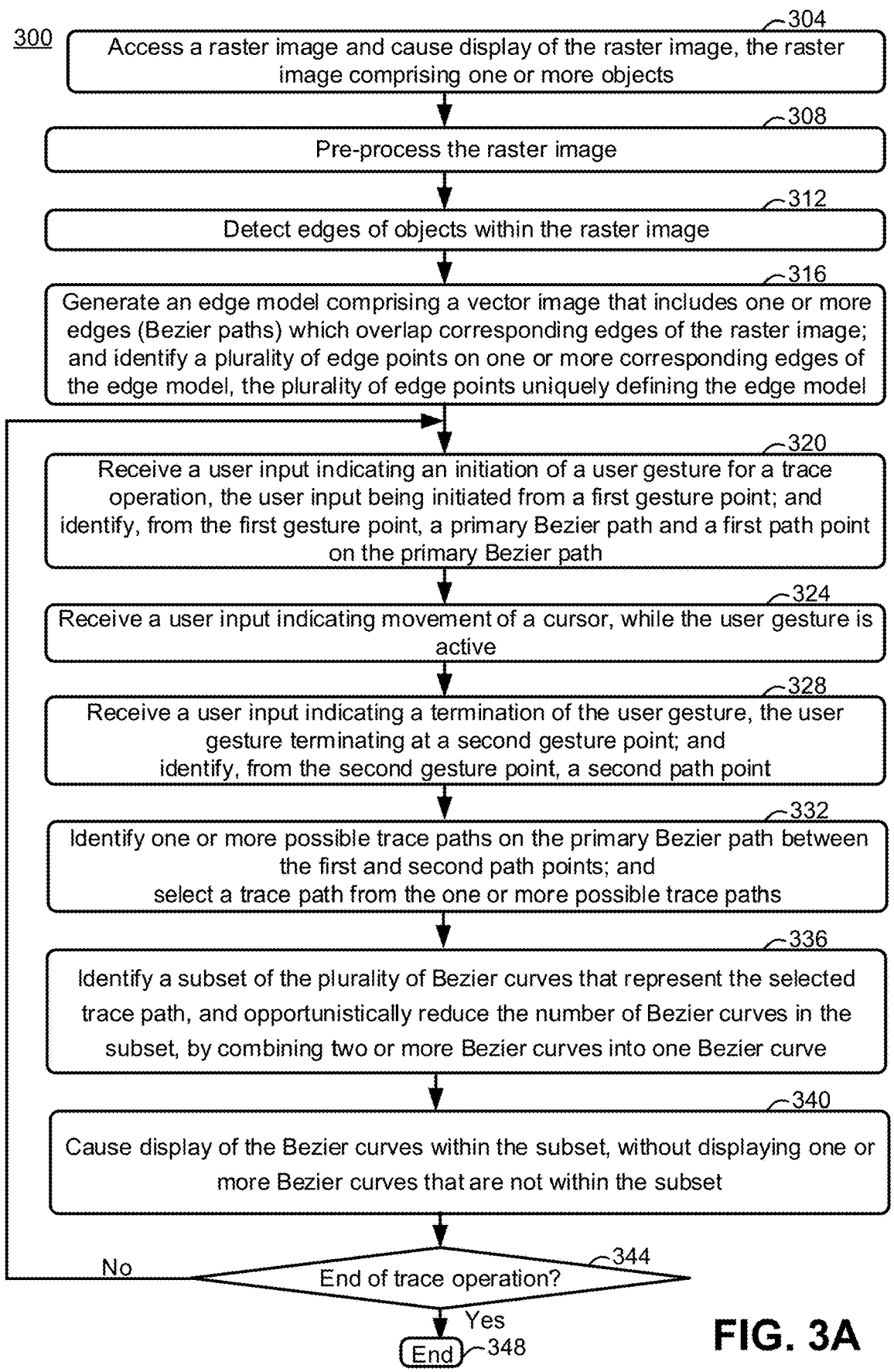
FIG. 3A is a flowchart illustrating an example method for tracing a raster image, in accordance with some embodiments of the present disclosure.

FIG. 3A is a flowchart illustrating an example method 300 for tracing a raster image, in accordance with some embodiments of the present disclosure. Method 300 can be implemented, for example, using the system architecture illustrated in FIGS. 1 and/or 2, and described herein, e.g., using the systems 102 and/or 202. However other system architectures can be used in other embodiments, as apparent in light of this disclosure. To this end, the correlation of the various functions shown in FIG. 3A (or in other flowcharts discussed herein in turn) to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system.

Figure 4A:
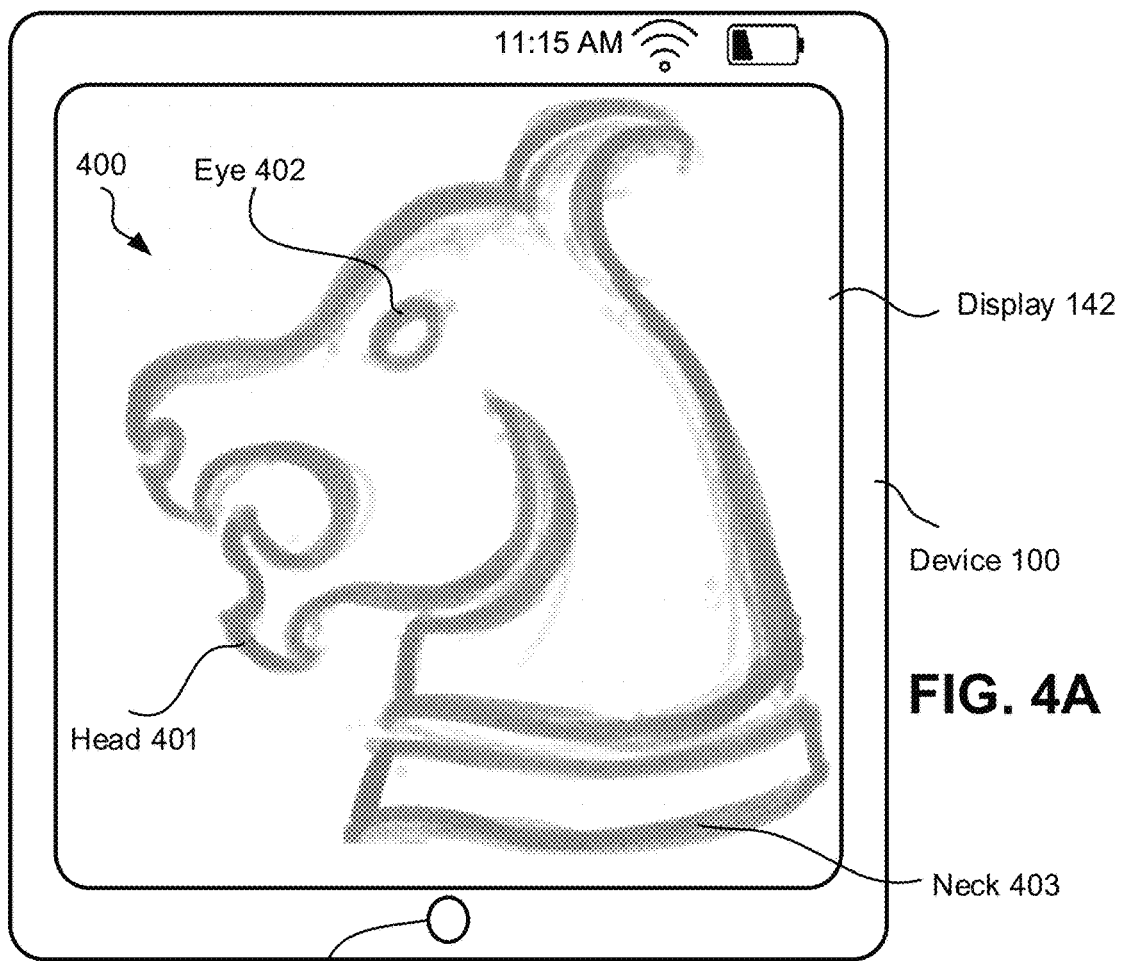

FIGS. 4A, 4B, 4C, 4D, 4E, 4E1, 4F, 4F1, 4G, 4H, 4I, 4J, 4K, 4L, 4M1, 4M2a, 4M2b, 4M3a, 4M3b, 4N1, 4N2a, 4N2b, 4N3a, 4N3b, 4O, 4P, and 4Q illustrate various example use cases associated with tracing a raster image 400, in accordance with some embodiments of the present disclosure. FIGS. 4A-4Q will be discussed in association with the method 300 of FIG. 3A.

The method 300 comprises, at 304, accessing a raster image (e.g., by the system 102 and/or 202) and causing display of the raster image on the display screen 142 of the device 100. The raster image can be a sketch, a photograph, or another appropriate type of raster image. For example, FIG. 4A illustrates a raster image 400 displayed on the display screen 142 of the device 100. In the example of FIG. 4A, the raster image 400 is a digital version of a hand-drawn sketch. Merely as an example, the raster image 400 is a scanned or photographed version of the hand-drawn sketch. However, any other type of raster images can be displayed, such as a photograph, as discussed with respect to FIG. 5.

The device 100 comprises, for example, a computer, a laptop, a desktop, a tablet computer, a smartphone, and/or any other computing device that can trace a raster image to generate a vector image. Although FIG. 4A illustrates the device 100 to be a handheld device, such as a mobile phone, a smart phone, or a tablet, such illustration does not limit the scope of this disclosure, and the device 100 can comprise any other type of computing device, such as a desktop or a laptop.

In some embodiments, the raster image 400 comprises one or more objects that are at least in part disjoint or detached. For example, in the raster image 400, example objects include a head 401, an eye 402, and a neck 403 of a sketch of an imaginary horse. The objects 401, 402, 403 are detached or disjoint in the sense that edges of these objects do not overlap with each other in the image 400.

Referring again to FIG. 3A, the method 300 then proceeds from 304 to 308, where the image pre-processing module 104 of the system 102 preprocesses the image 400. Pre-preprocessing the image 400 involves, merely as an example, adjusting brightness and contrast of the image 400, reducing noise within the image, applying Gaussian blur to improve edge detection, and/or any appropriate pre-processing techniques employed to pre-process a raster image. Pre-processing the image 400 facilitates subsequent detection of edges of the image.

The method 300 then proceeds from 308 to 312, where the edge detection module 108 detects one or more edges of one or more objects within the image 400. Edge detection includes a variety of mathematical methods that aim at identifying points in a digital image at which the image brightness changes sharply or, more formally, has discontinuities. The points at which image brightness changes sharply are typically organized into a set of curved line segments termed as edges. Edge detection is a fundamental tool in image processing, machine vision and computer vision. In the ideal case, the result of applying an edge detector to an image may lead to a set of connected curves that indicate the boundaries of objects within the image, the boundaries of surface markings, as well as curves that correspond to discontinuities in surface orientation. Thus, applying an edge detection algorithm filters out information that may be regarded as less relevant, while preserving the important structural properties of an image.

The edge detection at 312 can be performed using any appropriate edge detection algorithm, such as, merely as an example and without limiting the scope of this disclosure, Canny edge detector. The Canny edge detector is an edge detection operator that uses a multi-stage algorithm to detect a wide range of edges in images. In other examples, any other appropriate edge detection algorithm can be used.

Figure 4B:
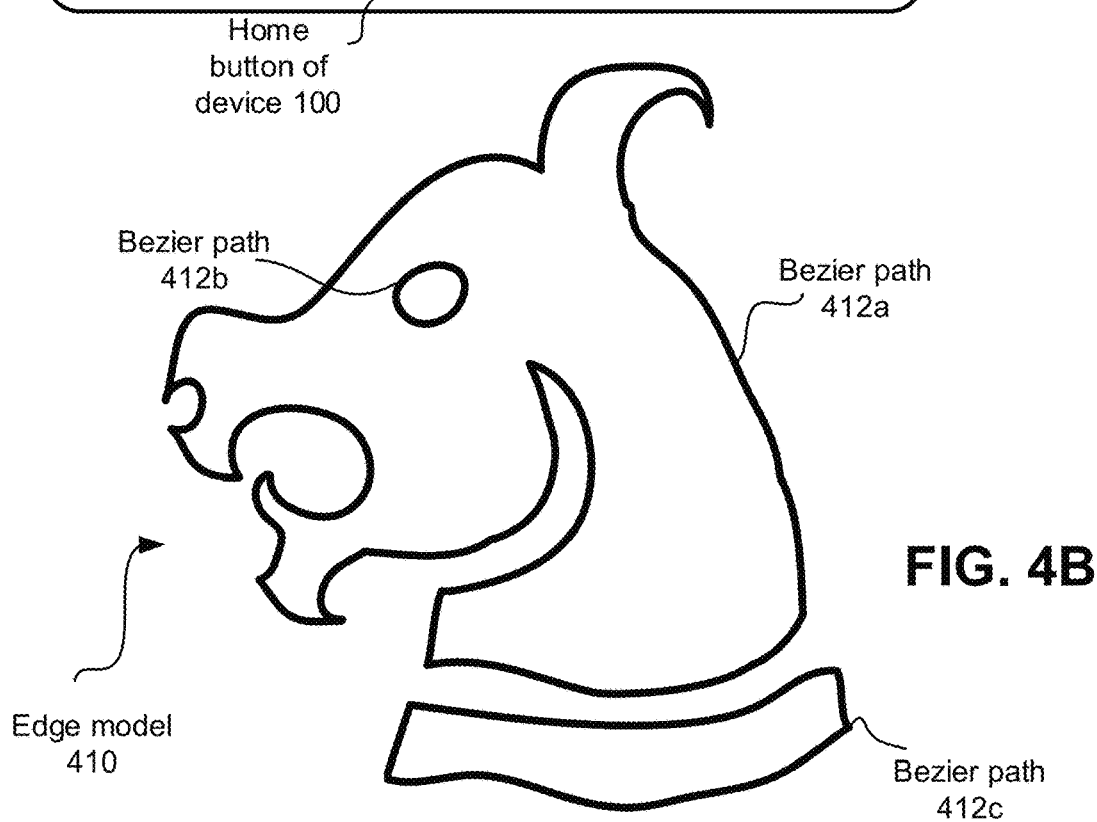

The method 300 then proceeds from 312 to 316, where the edge model generation module 112 generates an edge model comprising a vector image, such as the edge model 410 of FIG. 4B. In some embodiments, the edge model 410 includes one or more Bezier paths, where each Bezier path includes one or more Bezier curves, as will be discussed in detail in turn. The edge model 410, such as the Bezier paths, overlaps the edges of the raster image 400, as will be discussed in turn. In some embodiments, the edge model generation module 112, in the process of generating the edge model, also defines or identifies a plurality of edge points on one or more corresponding edges of the edge model, where the plurality of edge points uniquely defines the edge model, as will be discussed in detail in turn.

Figure 4C:
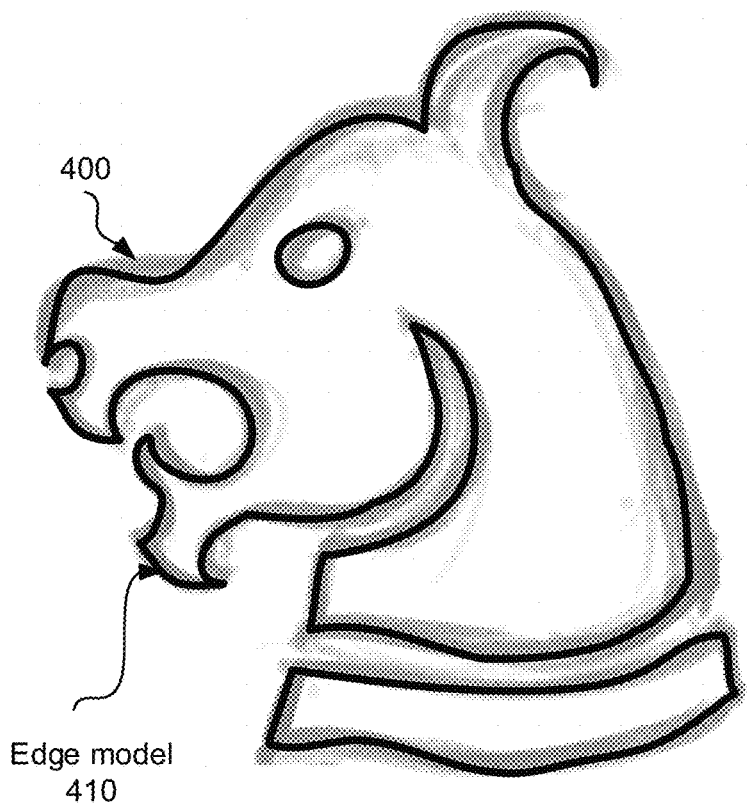
Figure 5:
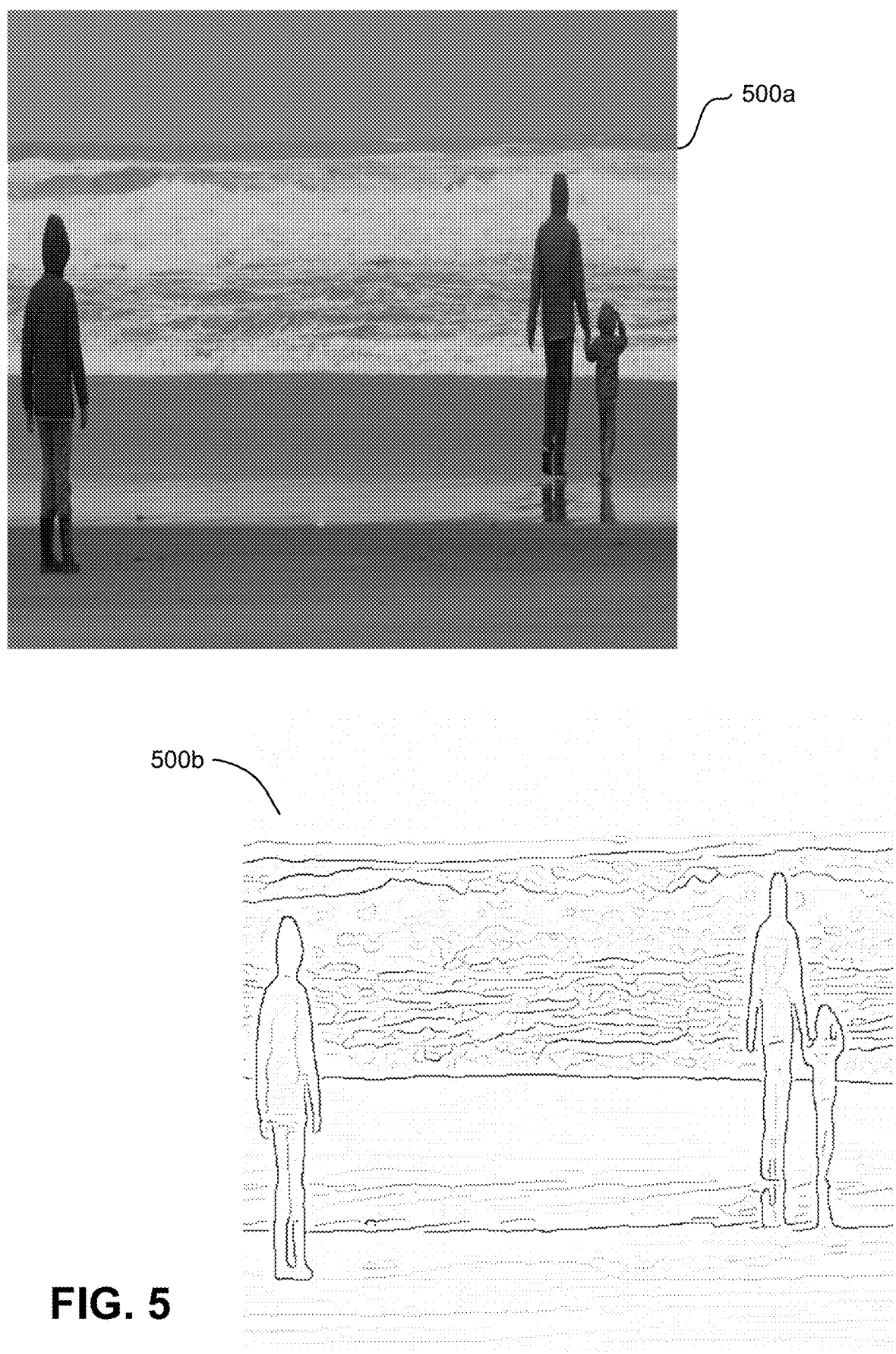
FIG. 5 illustrates an original image, and another image depicting edges of objects within the original image, in accordance with some embodiments of the present disclosure.

Merely as an example, FIG. 4B illustrates the edge model 410 comprising edges of the image 400 of FIG. 4A. In another example, FIG. 5 illustrates the resulting edge model 500b of an original photograph 500a. As discussed, the edge model 410 depicts edges of the image 400, and the edge model 500b depicts edges of the photograph 500a. Hence, when superimposed on the image 400, the edge model 410 overlaps the edges of the image 400; likewise, when superimposed on the photograph 500a, the edge model 500b overlaps the edges of the photograph 500a. For example, FIG. 4C illustrates the edge model 410 superimposed on, and matching or overlapping with, the edges of the image 400. The illustration of FIG. 4C is not displayed on the display screen 142 of the device 100, according to some embodiments (but it could be in others). In the remaining description, and as will be appreciated, photograph 500a can be substituted for image 400, and edge model 500b can be substituted for edge model 410, according to some embodiments.

Referring to FIGS. 4A and 4B, the image 400 comprises thick strokes, and often includes strokes that are duplicated on top of each other. The pre-processing at 308 cleans the raster image, such that the detected edges in FIG. 4B does not include such duplicate strokes. Thus, the edges of the edge model 410 comprises cleaned edge version of the image 400.

In some embodiments, the edges of the edge model 410 of the image 400 are not displayed on the display 142 of the device 100. Accordingly, the edge model 410 of FIG. 4B is not illustrated within the display screen 142 of the device 100.

In some embodiments, the edge model 410 comprises a plurality of Bezier curves. Bezier curves are an integral part of vector graphics. Vector contents are often represented using Bezier curves, such as linear, quadratic and/or cubic Bezier curves. For example, lines in vector graphics are often approximated using Beziers curves. A Bezier curve is defined using two or more control points. For example, given distinct end points P0 and P1, a linear Bezier curve is simply a straight line between those two points. A quadratic Bezier curve is defined by two end points P0 and P1 and an additional control point. A cubic Bezier curve is defined by two end points P0, P1, and two additional control points. Thus, in general, a Bezier curve comprises two end points defining two ends of the Bezier curve, and may include additional one or more control points, where the control points define the curvature of the Bezier curve.

In some embodiments, the edge model 410 comprises a plurality of Bezier curves. For example, the edges of the image 400 are broken down or split in multiple Bezier curves, to define the edge model 410. Thus, the edge model 410 is a vector image comprising the Bezier curves.

In an example, the edge model 410 include one or more Bezier paths 412a, 412b, 412c. For example, as discussed, the raster image 400 comprises one or more objects that are disjoint or detached, such as the head 401, the eye 402, and the neck 403. The objects 401, 402, 403 are detached or disjoint in the sense that edges of these objects do not overlap in the image 400. In some embodiments, each Bezier path 412 is associated with a respective object. For example, the Bezier path 412a comprises a plurality of Bezier curves that represent edges of the object 401 (i.e., the head 401); the Bezier path 412b comprises a plurality of Bezier curves that represent edges of the object 402 (i.e., the eye 402); and the Bezier path 412c comprises a plurality of Bezier curves that represent edges of the object 403 (i.e., the neck 403), as illustrated in FIGS. 4A and 4B. As illustrated in FIG. 4B, a Bezier path is detached or isolated from other Bezier paths. For example, the Bezier path 412a is detached from the Bezier path 412b and/or 412c. Similarly, the Bezier path 412b is detached from the Bezier path 412a and/or 412c, and so on.

Figure 4D:
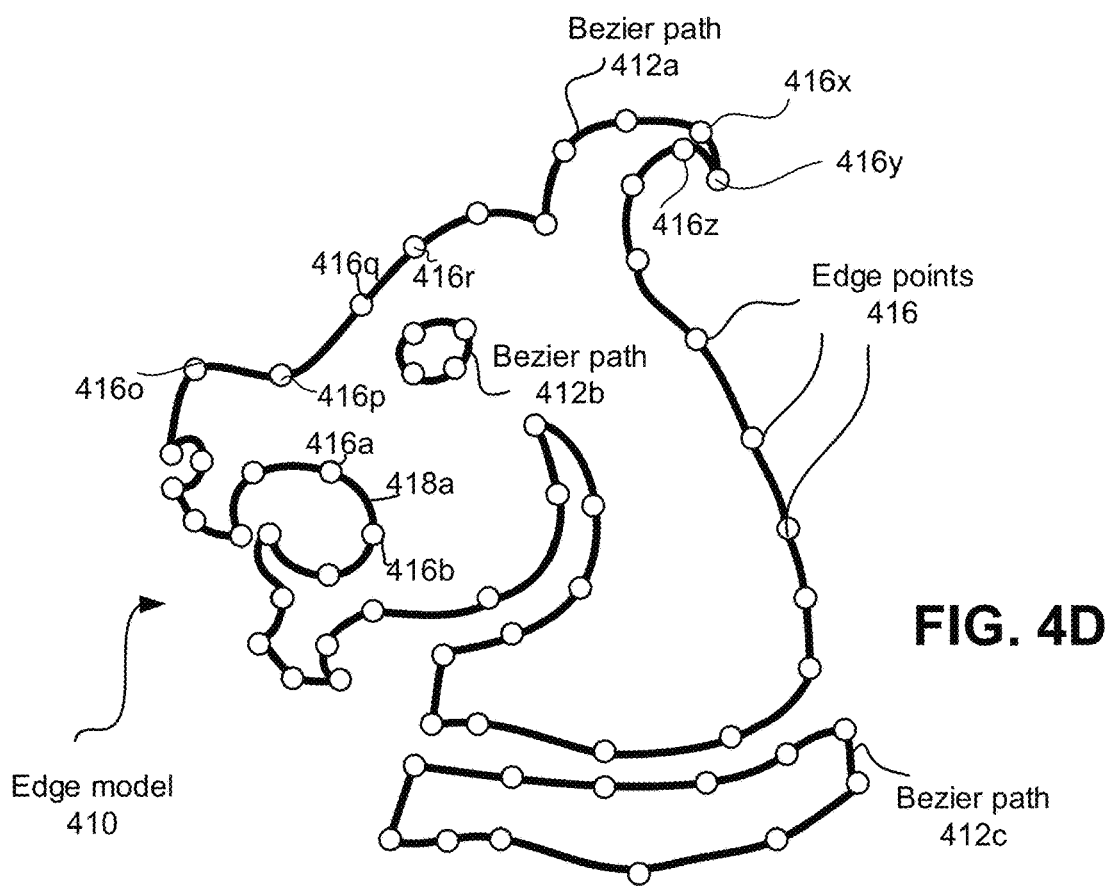

FIG. 4D illustrates the edge points 416. In some embodiments, at least some (or all) of the edge points 416 are the end points of the corresponding Bezier curves. For example, in FIG. 4D two example edge points 416a and 416b are labeled, and also labeled is a section 418a of the edge model 410 between the two edge points 416a and 416b. In an example, the section 418a is a Bezier curve, and the edge points 416a and 416b form two end points of the Bezier curve. The Bezier curve can also have zero (e.g., if the Bezier curve is a linear Bezier curve), one (e.g., if the Bezier curve is a quadratic Bezier curve), two (e.g., if the Bezier curve is a cubic Bezier curve), or even higher (e.g., if the Bezier curve is a higher order Bezier curve) number of additional control points—however, such control points are not illustrated in FIG. 4D. Note that the additional control points need not be located on the Bezier path 412a-rather, the additional control points associated with the Bezier curve 418a is likely to be located external to the curve 418a.

The two edge points 416a and 416b, along with the additional control points, uniquely define the Bezier curve 418a. Thus, the various edge points 416 of FIG. 4D, along with one or more additional control points that are not on the edges of the edge model 410, uniquely define the edge model 410.

Figure 4E:
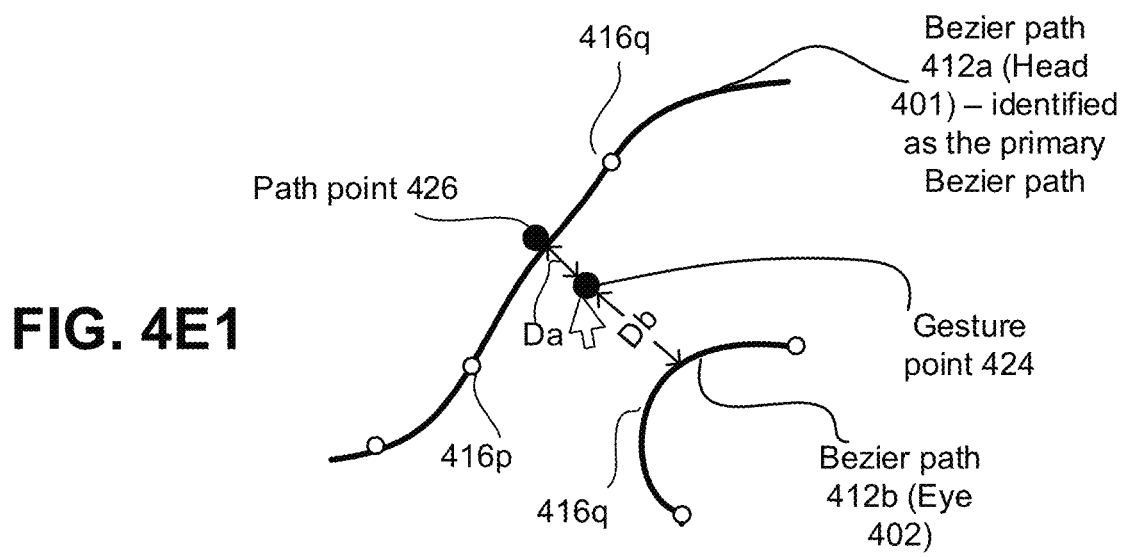
Figure 4E:
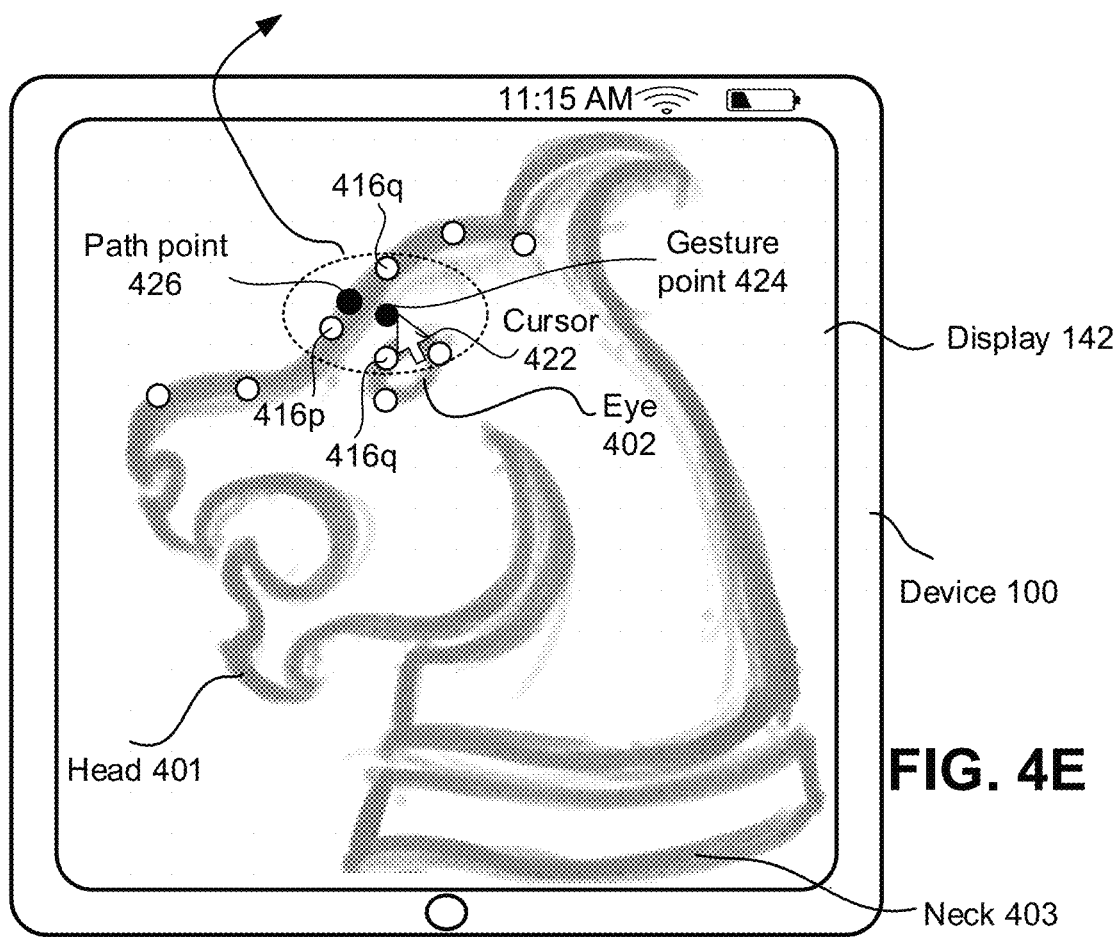

Referring again to FIG. 3A, the method 300 proceeds from 316 to 320. At 320, the user gesture detection module 116 receives a user input indicating a start of a user gesture for a trace operation. The user gesture detection module 116 also identifies a first gesture point at which the user gesture is initiated. For example, referring to FIGS. 4E and 4E1, the user gesture is initiated at a first gesture point 424, indicated by a cursor 422, e.g., a mouse pointer. In some embodiments, the user gesture detection module 116 identifies the Bezier path 412a as a primary Bezier path, and also identifies a first path point 426, based on the first gesture point 424, as will be discussed in detail in turn with respect to FIGS. 3B1 and 3B2. FIG. 4E1 illustrates a magnified view of the section of FIG. 4E encircles with dotted lines.

In some embodiments, when the I/O components 138 includes a computer mouse, the user gesture can be executed via mouse press-and-hold or click-and-hold (e.g., the user 101 clicks or presses the mouse, and moves the mouse while the mouse is being pressed), and/or consecutive mouse clicks. For example, the press-and-hold gesture is initiated by pressing the mouse button with a finger. In the example of FIGS. 4E and 4E1, the gesture is initiated at the gesture point 424. The gesture remains active while the user continues to hold that press in place, and moves the mouse to cause a cursor 422 to move on the display screen 142. The gesture terminates when the user 101 releases the press from the mouse button.

In other embodiments, the user gesture is performed by consecutive mouse clicks. For example, a first mouse click initiates the gesture, and a second mouse click terminates the gesture. The gesture is active between the two mouse clicks. Note that the second mouse click indicates an end of a first user gesture, and can be considered to be an initiation of a subsequent mouse gesture.

In some other embodiments, when the I/O components 138 includes a touch screen display (e.g., when the display screen 142 is a touch screen display), the user gesture can comprise a tap-and-hold or a drag gesture. The tap-and-hold gesture is initiated by tapping on the display screen 142 with a finger or stylus or other such implement, and continuing to hold that tap in place on the display screen 142. In the example of FIGS. 4E and 4E1, the gesture is initiated at the gesture point 424. The input gesture remains active while the tap is held on the display screen 142 and is moved around the display screen 142, and terminates when the user 101 releases the tap from the display screen 142.

In other embodiments, the user gesture is performed by consecutive taps on the display screen 142. For example, a first tap initiates the gesture, and a second tap terminates the gesture. The gesture is active between the two taps. Note that the second tap indicates an end of a first user gesture, and can be considered to be an initiation of a subsequent mouse gesture.

In some other embodiments, the user gesture can be initiated and executed using any other appropriate input component, such as a trackpad, a trackball, or another input component.

Thus, as illustrated in FIG. 4E, the user gesture starts from the gesture point 424. Thus, the gesture point 424 is where the cursor 422 is, when the user clicks the mouse or taps to initiate the user gesture. Note that when the user initiates the user gesture, the edge points 416 are not displayed on the screen 142—rather, the raster image 400 is displayed, and the user aims to select a point of an edge of the raster image 400 to initiate the user gesture.

In some embodiments, the gesture point 424 may not exactly lie on an edge. For example, in FIG. 4E, the gesture point 424 is between an edge of the head 401 and an edge of the eye 401.

FIG. 3B1 is a flowchart illustrating an example method 320a to identify a path point and a primary Bezier path associated with an initiation of a user gesture, where a gesture point from where the user gesture initiated is not on any Bezier path, in accordance with some embodiments of the present disclosure. Thus, the method 320a of FIG. 3B1 is an example implementation of block 320 of the method 300 of FIG. 3A.

Referring to FIGS. 3B1, 4E, and 4E1, at 320a1, a user input indicating an initiation of the user gesture for the trace operation is received, as discussed with respect to block 320 of FIG. 3A. In the example of FIG. 3B1, the user input is initiated from a gesture point that is not on any Bezier path, as illustrated in FIGS. 4E and 4E1.

At 320a2, the gesture point 424 is projected on nearby Bezier paths (such as Bezier paths 412a, 412b). In the example of FIG. 4E1, a projection distance between the gesture point 424 and the Bezier path 412a is Da, and a projection distance between the gesture point 424 and the Bezier path 412b is Db. Thus, Da is a distance between the gesture point 424 and a point of the Bezier path 412a that is closest to the gesture point 424. Similarly, Db is a distance between the gesture point 424 and a point of the Bezier path 412b that is closest to the gesture point 424. So, put differently, Da represents a shortest distance between the gesture point 424 and the Bezier path 412a, and Db represents a shortest distance between the gesture point 424 and the Bezier path 412b. In the example of FIG. 4E1, merely two Bezier paths are nearby the gesture point 424, and hence, only two distances Da and Db are calculated. However, if more than two Bezier paths are somewhat close (e.g., closer than a threshold distance) to the gesture point 424, then the projection distance between the gesture point 424 and each of such Bezier paths are also determined in block 320a2. Note that the user 101 can initiate the user gesture from the gesture point 424 for the tracing operation if the gesture point 424 at within at least the threshold distance from at least one Bezier path.

At 320a3, the user gesture detection module 116 identifies a projection distance that is lowest among the project distances. For example, in FIG. 4E1, the projection distance Da is identified to be lowest among the projection distances Da and Db.

At 320a4, the user gesture detection module 116 identifies the corresponding Bezier path (to which the projection distance is lowest) as the primary Bezier path, and identifies a point of projection on the primary Bezier path as a path point. For example, referring to FIG. 4E1, the Bezier path 412a corresponding to the head 401 is identified as the primary Bezier path, and a point of projection on the primary Bezier path is identified as the path point 426. In this example, the path point 426 is between edge points 416p and 416q. A path point is a point of a Bezier path through which the tracing is done. In the example of FIG. 4E1, the tracing is initiated from the path point 426. This ends the method 320a of FIG. 3B1, and the method 320 of FIG. 3A proceeds to the next block.

FIG. 3B2 illustrates pseudo code 320a that corresponds to at least some of the operations of the method 320a of FIG. 3B1, in accordance with some embodiments of the present disclosure. In the pseudo code 320a of FIG. 3B2, the distances D1, D2 and so on are distance Da and Db of FIG. 4E1. The $D_{min}$ is the distance Da, which is the minimum of distances D1, D2. Accordingly, the Bezier path 412a is identified as the primary Bezier path, and a point on the primary Bezier path closest to the gesture point 424 is identified as the path point 426.

Figure 3C:
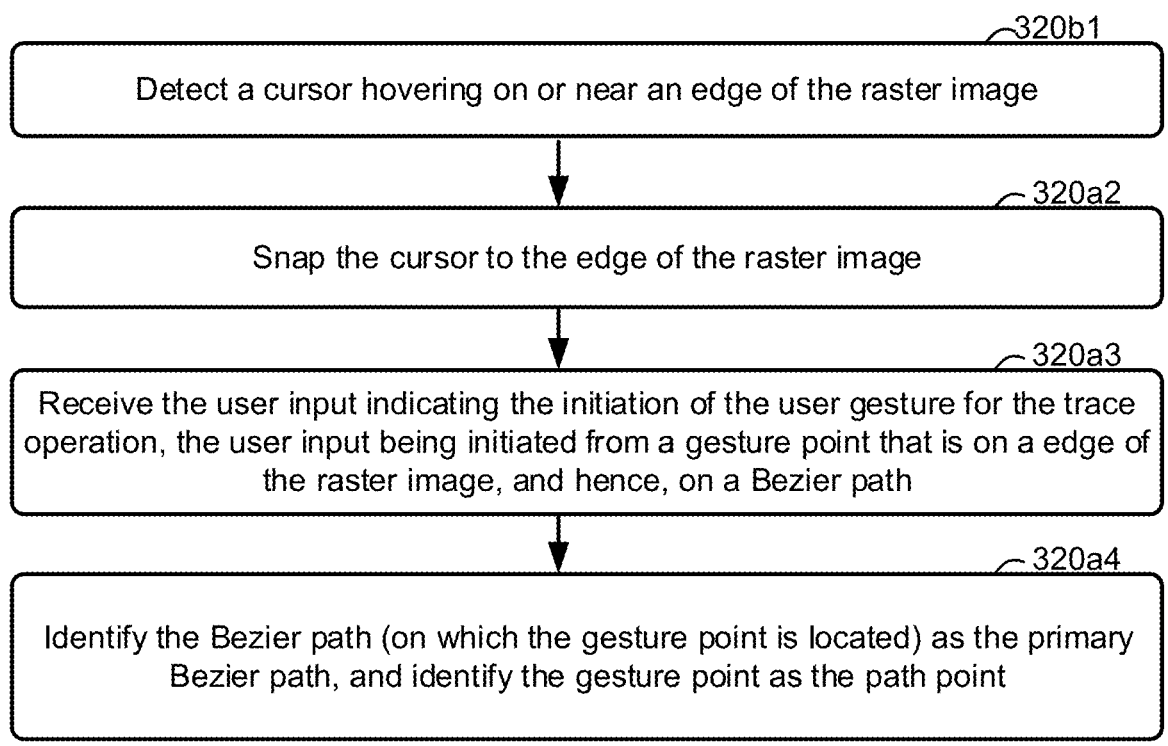
FIG. 3C is a flowchart illustrating an example method to identify a path point and a primary Bezier path associated with the initiation of a user gesture, where an initial user-provided gesture point is snapped to a Bezier path, in accordance with some embodiments of the present disclosure.
Figure 4F:
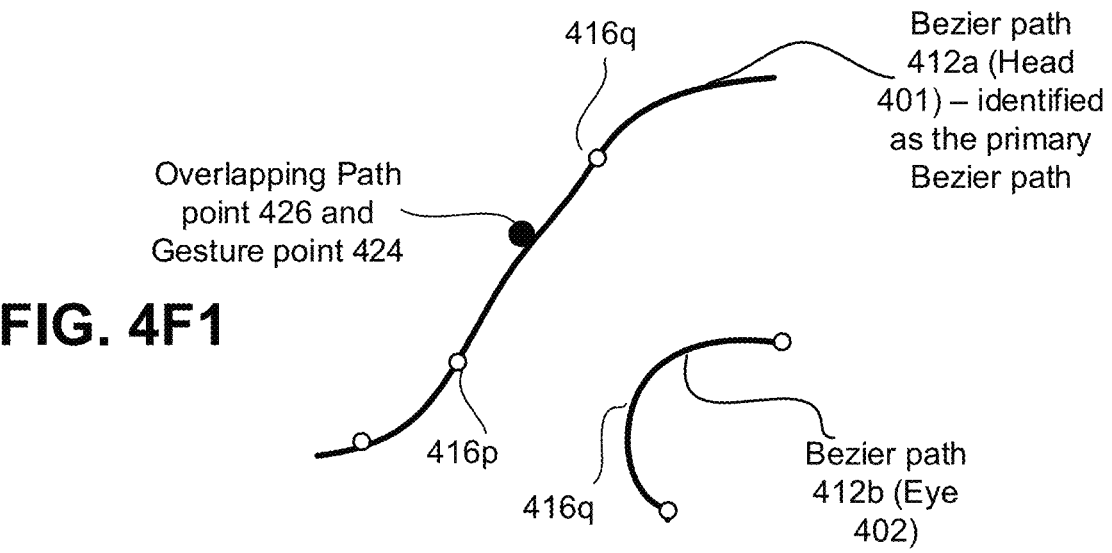
Figure 4F:
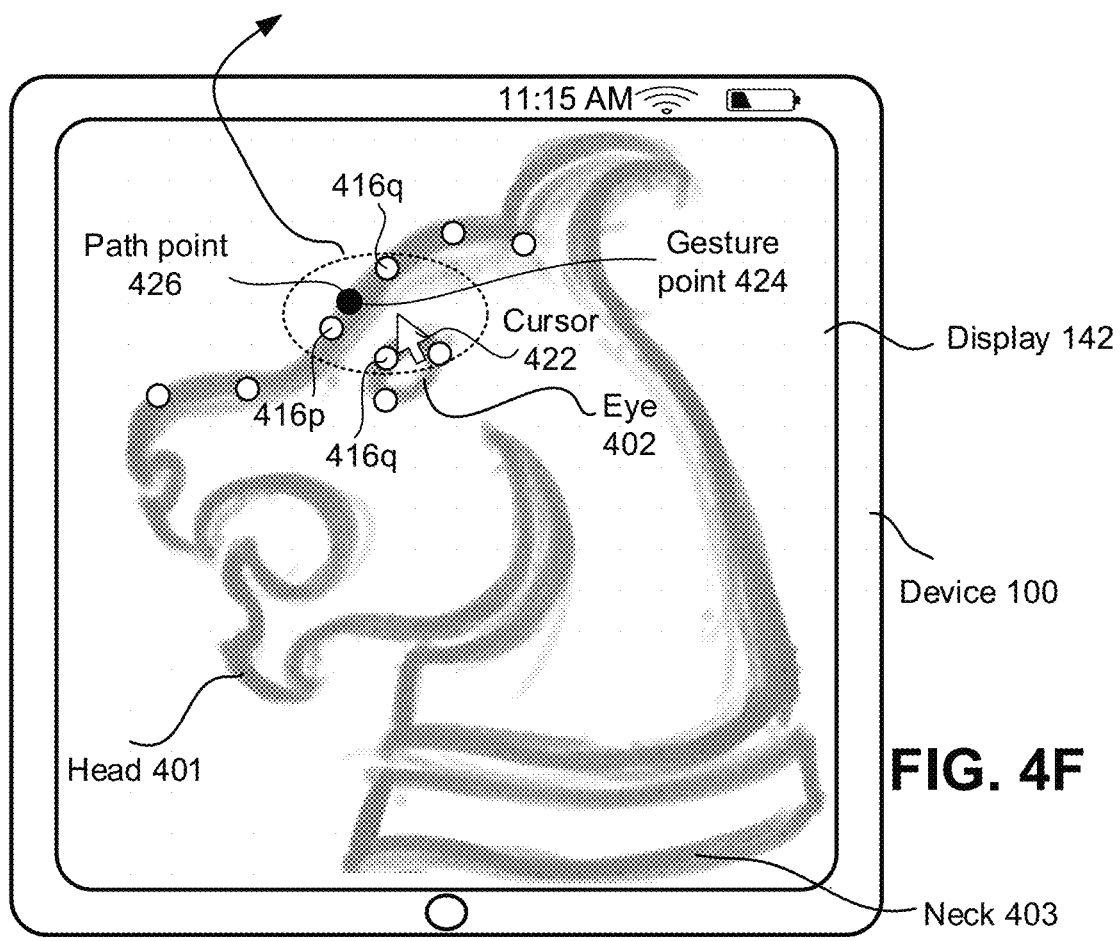

In the method 320a of FIG. 3B1, the gesture point 424 was not on any edge of the raster image 400. However, in some embodiments, a gesture point can be snapped to an edge of the raster image 400. FIG. 3C is a flowchart illustrating an example method 320b to identify a path point and a primary Bezier path associated with the initiation of a user gesture, where a gesture point from where the user gesture initiated is snapped to a Bezier path, in accordance with some embodiments of the present disclosure. Thus, method 320b of FIG. 3C is another example implementation of block 320 of the method 300 of FIG. 3A. The method 320b is explained with respect to FIGS. 4F and 4F1, where FIG. 4F1 illustrates a magnified view of a section of FIG. 4F.

Referring to FIG. 3C, at 320b1, detect a cursor 422 hovering on or near an edge of the raster image 400. For example, as the Bezier paths 412a, 412b, 412c are superimposed on the edges of the raster image 400, the detection at 320b1 is performed by detecting cursor 422 hovering on or near one or more of the Bezier paths 412a, 412b, 412c. Here, "near" implies equal to or less than a threshold distance.

At 320a2, the cursor 422 is caused to be snapped to the edge. For example, with the snap function, when the user moves the cursor 422 to a location sufficiently close to an edge (e.g., closer than a threshold distance), the cursor 422 is moved automatically so that it is in contact with the edge. Thus, due to the snap operation, in such examples, the user gesture is always initiated from an edge of the raster image (i.e., the gesture point lies of the edge). Note that snapping the cursor 422 does not imply that the user gesture has initiated. The user can freely move the cursor 422 to any other section of the raster image 400. However, whenever the cursor 422 is close enough to an edge, the cursor 422 snaps to the edge, and the user 101 is free to initiate the user gesture.

At 320a3, the user gesture detection module 116 receives the user input indicating the initiation of the user gesture for the trace operation, the user input being initiated from a gesture point that is on an edge of the raster image, and hence, on a Bezier path. Thus, referring to FIGS. 4F and 4F1, due to the snapping operation, the gesture point is now 424, which is on the edge of the raster image 400 representing the head 401, and hence, on the Bezier path 412a.

At 320a4, the Bezier path 412a, on which the gesture point is located, is identified as the primary Bezier path. Also, the gesture point is identified as the path point 426. Note that unlike the method 320a of FIG. 3B1, in the method 320b of FIG. 3C, the gesture point and the path point 426 overlaps, because the gesture point is on a Bezier path.

Thus, based on the implementation, any of the methods 320a, 320b can be used for the block 320 of method 300 of FIG. 3A. At the end of the method 320a or 320b, the method 300 then proceeds from block 320 to block 324 of FIG. 3A.

Note that at the end of block 320, the user gesture detection module 116 detects the primary Bezier path 412a, and the path point 426 that is on the primary Bezier path 412a. As will be discussed herein in turn, the tracing operation will initiate from the path point 426 and will continue along the primary Bezier path 412a.

Figure 4G:
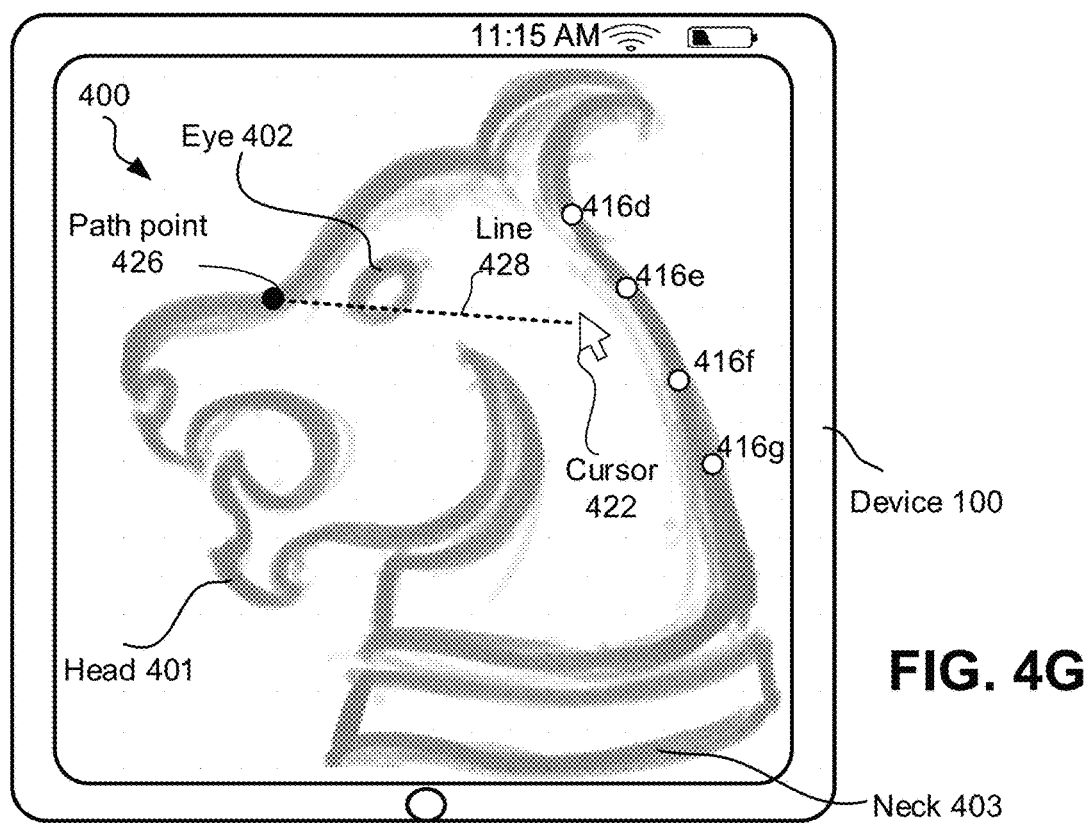

The method 300 then proceeds from 320 to 324, where the user gesture detection module 116 receives user input indicating movement of the cursor 422, as illustrated in FIG. 4G. For example, as and when the user 101 moves the cursor 422, a dotted line 428 connecting the path point 426 and the current position of the cursor 422 is displayed on the display screen 142. In another example, the line 428 can be a solid line as well, instead of being dotted. Thus, the line 428 has one end anchored to the path point 426, and another free-moving end that moves along with the cursor 422. Thus, the position of the line 428 changes with the movement of the cursor 422, where the cursor 422 moves with execution of the user gesture.

As discussed, if the user gesture is a tap-and-hold user gesture, the user 101 has to continue holding the tap, while moving the stylus or finger (or other medium) over the display screen 142, to cause moving the cursor 422 over the image 400. Similarly, if the user gesture is a press-and-hold user gesture with a mouse, the user 101 has to continue pressing the mouse, while moving the mouse to cause moving the cursor 422 over the image 400. Similarly, if the user gesture is two consecutive mouse clicks or taps on the display screen 142, the user 101 can move the cursor 422 over the image 400 between the two clicks or taps.

Figure 4H:
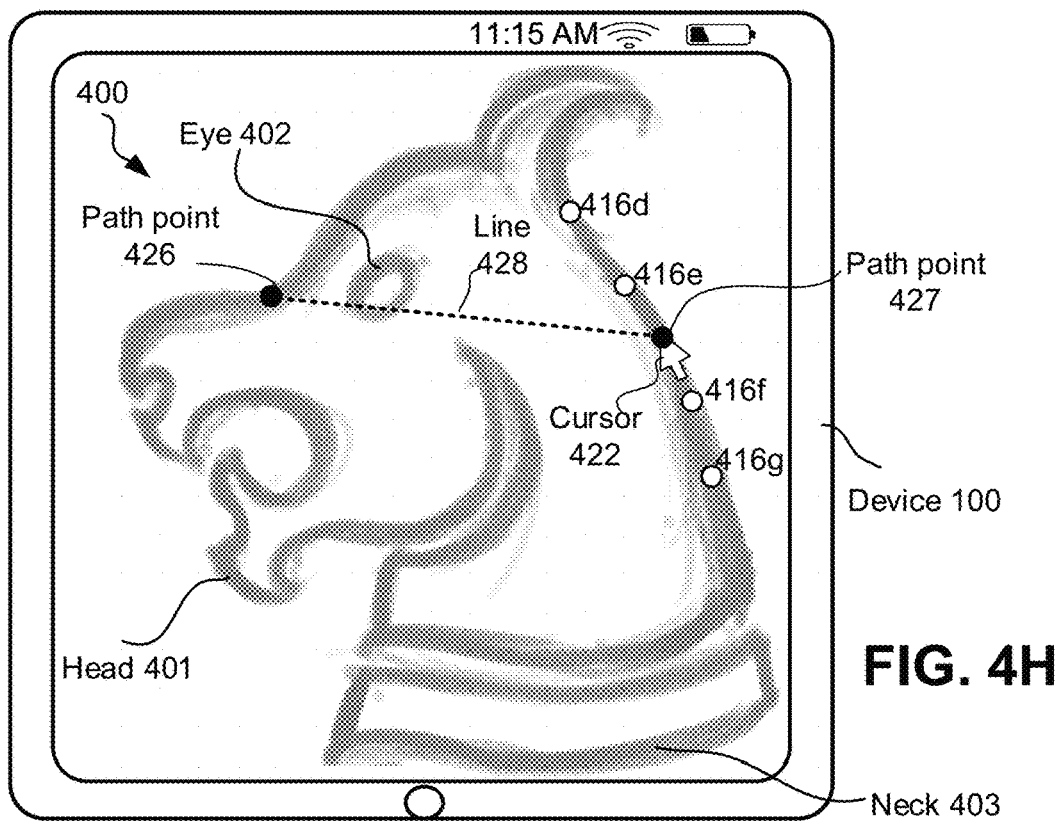
Figure 4I:
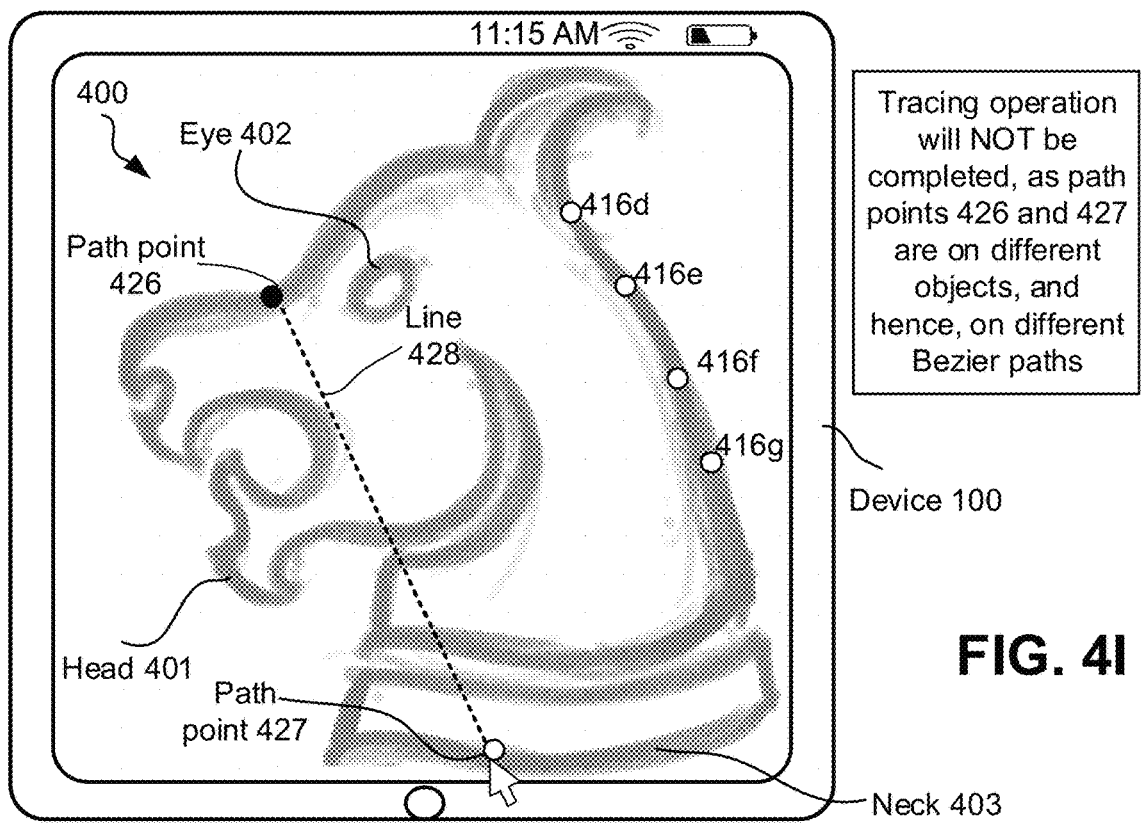

The method 300 then proceeds from 324 to 328, where the user gesture detection module 116 receives a user input indicating a termination of the user gesture, the user gesture terminating at a second gesture point. The user gesture detection module 116 then identifies, from the second gesture point, a second path point 427, as illustrated in FIG. 4H. For example, FIG. 4H illustrates the path point 427 between the edge points 416e, 416f.

In some embodiments, the other gesture point may not be located on an edge, but may be sufficiently close to an edge (e.g., closer than a threshold distance). In some such embodiments, the path point 427 can be identified by projecting the gesture point to the primary Bezier path, similar to the process of method 320a of FIG. 3B1. In some other embodiments, the cursor 422 snaps to the primary Bezier path, such that the gesture point is on the primary Bezier path, and hence, the gesture point and the path point 427 overlaps similar to the process of method 320b of FIG. 3C.

As discussed, if the user gesture is a tap-and-hold user gesture, the user 101 releases the tap to end the user gesture. Similarly, if the user gesture is a press-and-hold user gesture with a mouse, the user 101 releases the mouse button to end the user gesture.

Although a tap-and-hold and press-and-hold user gestures are discussed herein as examples, such examples of user gestures do not limit the scope of this disclosure, and other user gestures are also possible. Merely as an example, a first click of a mouse or a first tap on the display screen 142 can initiate the user gesture at 320. A subsequent click or tap can indicate the termination of the user gesture at 328. Thus, in such examples, the user need not hold the tap or press the mouse, while moving the cursor at 324.

Note that the user gesture can meaningfully be terminated only on or near an edge that belongs to the same object as the path point 426. For example, referring to the example of FIG. 4I, the user 101 terminates the user gesture at a path point 427a that is on the object 403 (i.e., neck 403), whereas the path point 426 is on the object 401 (i.e., head 401). As the initial path point 426 and the final path point 427 are on different objects, and hence on different Bezier paths, there cannot be any tracing between the two path points. Hence, for the example of FIG. 4I, the tracing operation will not be completed (e.g., will be terminated).

Figure 4J:
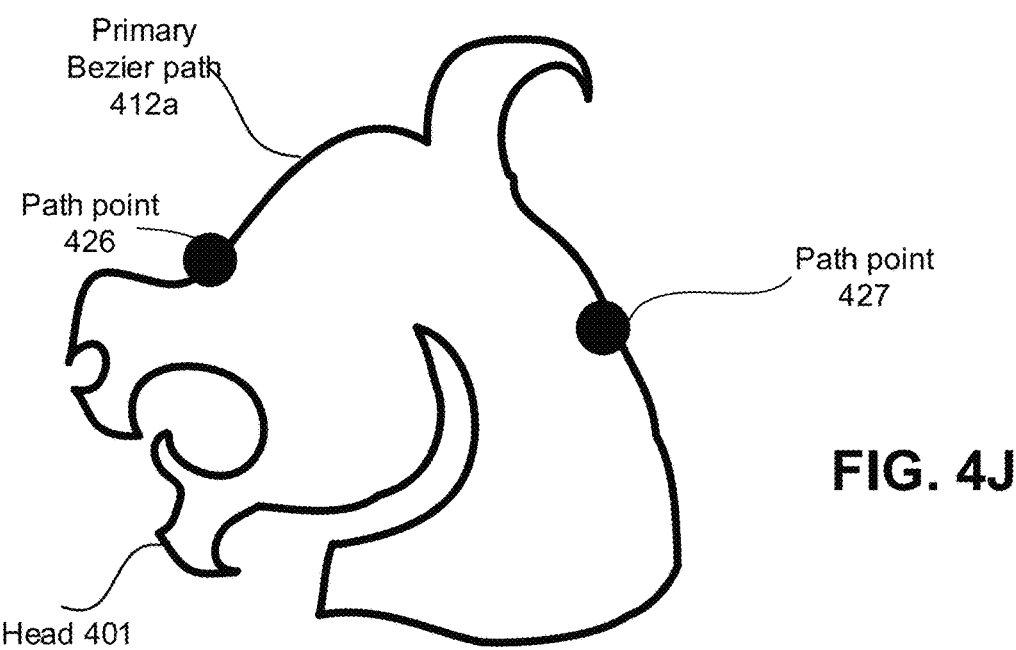

Thus, put differently, when the user gesture is initiated on or near a given Bezier path (e.g., which forms the primary Bezier path), the user gesture has to end on or near the same Bezier path. Thus, the user gesture has to terminate on the primary Bezier path. For example, FIG. 4J illustrates the primary Bezier path 412a comprising the path points 426, 427.

Figure 4K:
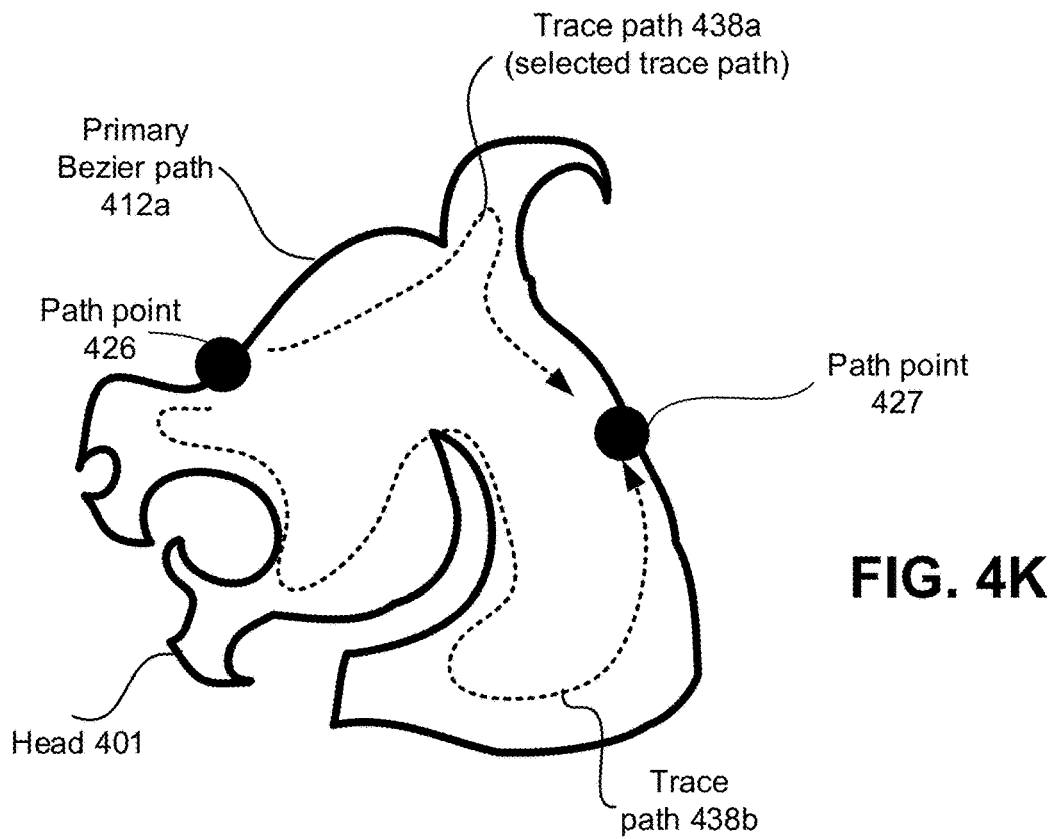

The method 300 then proceeds from 328 to 332, where the tracing module 120 identifies one or more possible trace paths on the primary Bezier path between the first and second path point 426, 427, and selects a trace path from the one or more possible trace paths. For example, FIG. 4K illustrates two possible traces paths 438a, 438b between the path points 426, 427 on the primary Bezier path 412a. A trace path is referred to as a possible path on the primary Bezier path to reach from the path point 426 to path point 427. In the example of FIG. 4K, two such trace paths 428a, 438b are possible. Note that a traces path 438 would overlap a corresponding section of the primary Bezier path—however, the dotted lines in FIG. 4K is illustrated separate from the primary Bezier path merely for convenience of illustration.

In the example of FIG. 4K, the trace path 438a is selected from the two possible trace paths 438a, 438b. The selection of the trace path can depend on one or more criteria. For example, a length of each of the trace path on the primary Bezier path is determined, and the trace path with the smallest length is selected. As seen in FIG. 4K, the trace path 438a has smaller length than the trace path 438b, and hence, the trace path 438a is selected.

In another example, a manner or direction in which the user moves the cursor 422 while traveling from path point 426 to path point 427 is taken into account to select the trace path 438a. For example, if the cursor 422 is moved over or near the top portion of the primary Bezier path 412a (such as over or near the ear) while moving from point 426 to 426, this signifies that the user may have intended to trace the top portion of the primary Bezier path 412a—in such an example, the trace path 438a is selected. On the other hand, if the cursor 422 is moved over or near the bottom portion of the primary Bezier path 412a (such as over or near the mouth or nose), this signifies that the user may have intended to trace the bottom portion of the primary Bezier path 412a—in such an example, the trace path 438b can be selected. Thus, in some such examples, it is assumed that user intention regarding the path to be traced is reflected by the direction of the cursor movement, and hence, a trace path is selected based on the direction of the mouse movement.

The method 300 then proceeds from 332 to 336, where the tracing module 120 identifies a subset of the plurality of Bezier curves that represent the selected trace path. For example, referring to FIG. 4D, the primary Bezier path 412a comprises a plurality of Bezier curves, where individual Bezier curve is between two corresponding edge points 416. Now referring to FIGS. 4K and 4L, a subset of the plurality of Bezier curves that represent the selected trace path 438a is identified, where the subset of Bezier curves is represented using solid lines in FIG. 4L, and Bezier curves outside the subset is represented by dotted lines.

Figure 4L:
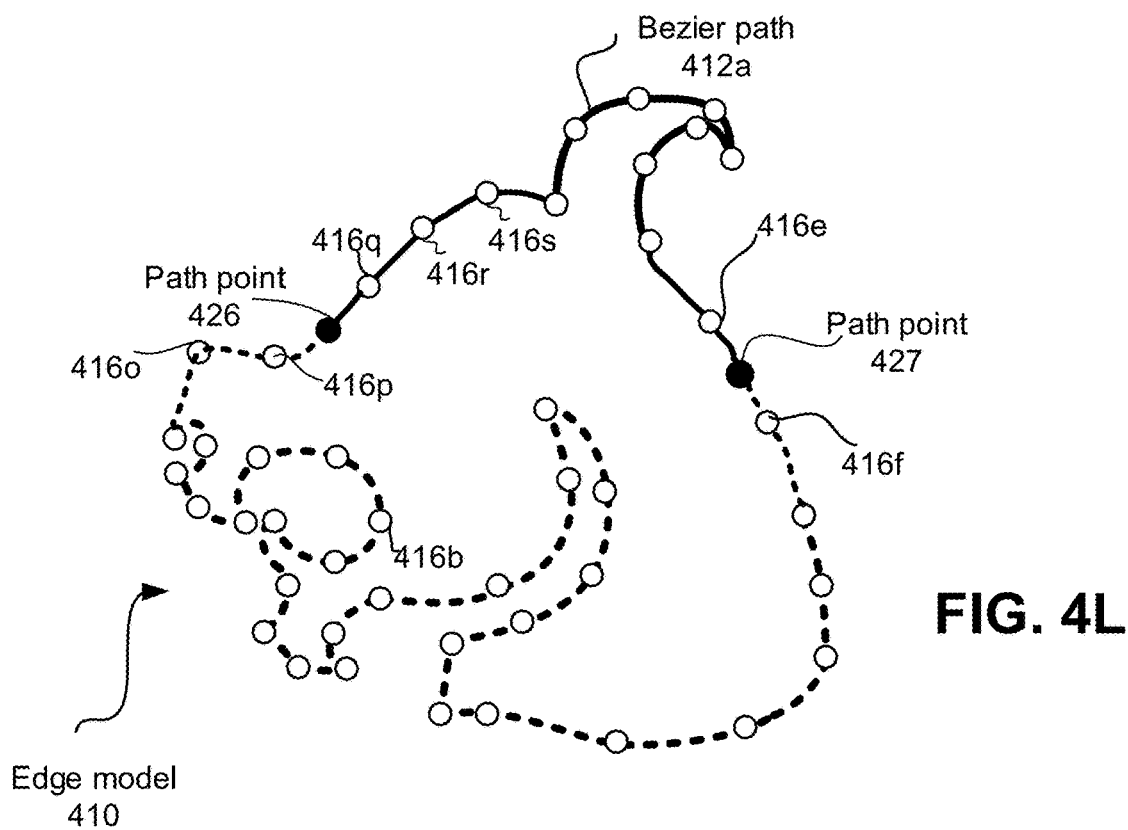

Note that as illustrated in FIG. 4L, each Bezier curve is between two corresponding edge points 412. For example, a first Bezier path is between edge points 416o and 416p, a second Bezier path is between edge points 416p and 416q, a third Bezier path is between edge points 416q and 416r, and so on. However, the path point 426 is between the edge points 416p and 416q. Thus, at 336, the tracing module 120 breaks the Bezier curve between edge points 41p and 416q into two Bezier curves: one between edge point 416p and path point 426, and another between path point 426 and edge point 416q. The Bezier curve between edge point 416p and path point 426 is excluded from the subset of Bezier curves (and hence illustrated using dotted lines), and the Bezier curve between path point 426 and edge point 416q is included in the subset of Bezier curves (and hence illustrated using solid lines).

Similarly, the Bezier curve between edge points 416e, 416f is broken into divided into two separate Bezier curves: one between edge point 416e and path point 427, and another between path point 427 and edge point 416f, as illustrated in FIG. 4L. The Bezier curve between edge point 416f and path point 427 is excluded from the subset of Bezier curves (and hence illustrated using dotted lines), and the Bezier curve between path point 427 and edge point 416e is included in the subset of Bezier curves (and hence illustrated using solid lines).

Also, at block 336, the tracing module 120 opportunistically reduces the number of Bezier curves in the subset, by combining two or more Bezier curves within the subset into one Bezier curve. For example, referring to FIG. 4L, the tracing module 120 may determine that the Bezier curves between the edge points 416q and 416r, and between the edge points 416r and 416s can be combined into a single Bezier curve, where an error generated between the set of two Bezier curves and the single Bezier curve due to the combining is less than a threshold value. In such a case, the tracing module 120 combines the two Bezier curves into a single Bezier curve.

Figure 3D:
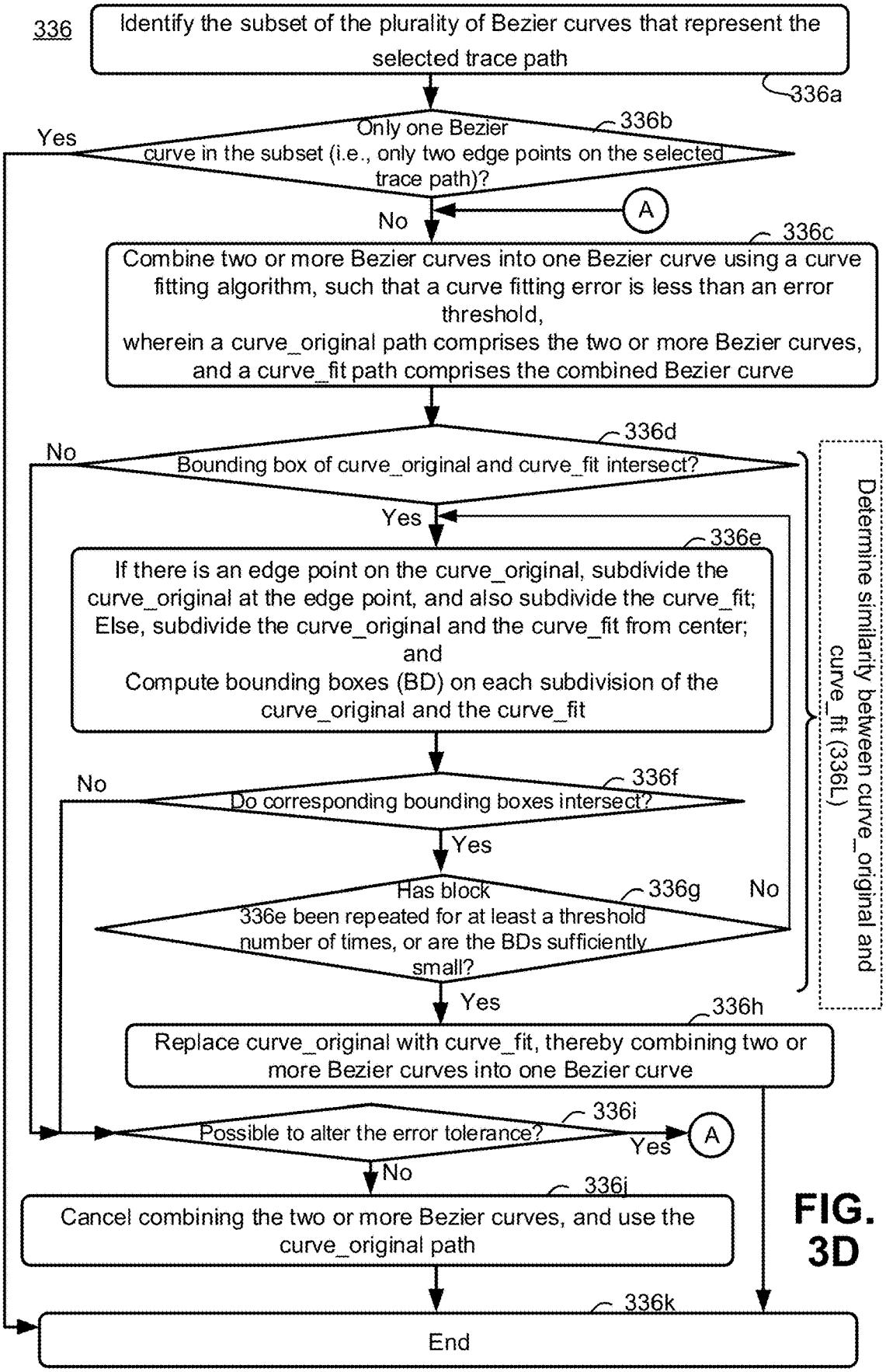
FIG. 3D is a flowchart illustrating an example method for opportunistically reducing a number of Bezier curves in a subset of Bezier curves representing a selected trace path, by combining two or more Bezier curves within the subset into one Bezier curve, in accordance with some embodiments of the present disclosure.

FIG. 3D is a flowchart illustrating an example method 336 for opportunistically reducing a number of Bezier curves in a subset of Bezier curves representing a selected trace path, by combining two or more Bezier curves within the subset into one Bezier curve, in accordance with some embodiments of the present disclosure. Thus, the method 336 of FIG. 3D is an example implementation of the block 336 of the method 300 of FIG. 3A.

Referring to FIG. 3D, at 336a, the tracing module 120 identifies the subset of the plurality of Bezier curves that represent the selected trace path, as discussed with respect to method 300 of FIG. 3A. At 336b, the tracing module 120 determines if only one Bezier curve is included in the subset. For example, in such a case, only two edge points will be on the selected trace path. If "Yes" at 336b, then the trace path comprising a single Bezier curve cannot be further simplified by combining two or more Bezier curves. Accordingly, if "Yes" at 336b, the method 336 ends at 336k, without combining any Bezier curves.

If "No" at 336b, there is a possibility of reduction of the number of Bezier curves in the subset. Accordingly, the method 336 moves to 336c, where the tracing module 120 combines two or more Bezier curves into one Bezier curve using an appropriate curve fitting algorithm, such that a curve fitting error is less than an error threshold. Here, a curve_original path comprises the two or more original Bezier curves, and a curve_fit path comprises the combined single Bezier curve. Any appropriate curve fitting algorithm can be used. Merely as an example, a FitCurve process developed by Philip J. Schneider can be used, although any other appropriate curve fitting algorithm may also be used.

Two example curve fitting use cases are discussed herein: a first example user case discussed with respect to FIGS. 4M1-4M3b, and a second example user case discussed with respect to FIGS. 4N1-4N3b. For example, as illustrated in FIGS. 4M1 and 4N1, a curve_original path 460 comprises two Bezier curves, where a first Bezier curve is between edge points 416d and 416e, and a second Bezier curve is between edge points 416e and 416f. In the first example of FIG. 4M1, a curve_fit path 480 comprises a single Bezier curve that can possible replace the curve_original path 460. In the example of FIG. 4N1, a curve_fit path 490 comprises a single Bezier curve that can possible replace the curve_original path 460. Comparing FIGS. 4M1 and 4N1, it is evident that the curve_fit path 480 of FIG. 4M1 is a better approximation of the curve_original path 460, compared to the curve_fit path 490 of FIG. 4N1. Accordingly, as will be discussed herein in turn, the method 336 will accept the curve_fit path 480 of FIG. 4M1, while rejecting the curve_fit path 490 of FIG. 4N1. The curve_fit path 480 of FIG. 4M1 and the curve_fit path 490 of FIG. 4N1 are generated at block 336c of FIG. 3D.

The method 336 then proceeds from 336c to 336d, where it is determined if a bounding box (BD) of curve_original and a bounding box of curve_fit intersect. A bounding box of a curve is a rectangle having two opposite ends overlapping with corresponding two ends of the curve. FIG. 4M1 illustrates BD 462 associated with the curve_original 460 and BD 482 associated with the curve_fit 482. FIG. 4N1 illustrates BD 462 associated with the curve_original 460 and BD 492 associated with the curve_fit 492. Because the ends of the curve_original 460 and the curve_fit 482 overlaps in FIG. 4M1, the BDs 462, 482 intersect and is shown to be a single bounding box. Similarly, in FIG. 4N1, the BDs 462, 492 intersect.

If "No" at 336d, the method 336 proceeds to 336i, where it is determined if it is possible to alter the error tolerance (where the error tolerance was used in 336c to generate the combined Bezier curve). Merely as an example, initially, a fixed value of error tolerance can be used in block 336c. Subsequently, the error tolerance can be dynamically updated, such that the error tolerance is a function of a length of the curve_original (e.g., the longer is the curve_original, the higher is the error tolerance).

If "Yes" at 336i, i.e., if error tolerance can be altered, the method loops back to 336b, where the altered error tolerance is used to generate the curve_fit path. If "No" at 336i, i.e., if error tolerance has been altered in the past and cannot be further altered, then the method 336 proceeds to 336j, where the combination operation is cancelled, and the curve_original path is used, and then the method 336 ends at 336k.

Referring again to block 336d, if "Yes" at block 336d, the method 336 proceeds to block 336e. Note that for each of the examples depicted in FIGS. 4M1 and 4N1, the block 336d would output an "Yes," as the bounding boxes intersect in each example.

At 336e, if there is an edge point on the curve_original, the curve_original is subdivided at the edge point, and the curve_fit is also subdivided. If there is not edge point on the curve_original, the curve_original and the curve_fit is subdivided from center. For example, in FIG. 4M2a, each of the curve_original 460 and the curve_fit 480 is subdivided in two sections. Similarly, in FIG. 4N2a, each of the curve_original 460 and the curve_fit 490 are subdivided in two sections.

Also at 336e, bounding boxes for each subdivision of the curve_original and the curve_fit are determined. For example, in FIG. 4M2b, BDs 462a1, 462a2 are respectively determined for the two subdivisions of the curve_original 460, and also BDs 482a1, 482a2 are respectively determined for the two subdivisions of the curve_fit 460. Similarly, in FIG. 4N2b, BDs 462a1, 462a2 are respectively determined for the two subdivisions of the curve_original 460, and also BDs 492a1, 492a2 are respectively determined for the two subdivisions of the curve_fit 460.

Note that the curve_original, the various subdivisions of the curve_original, and the BDs associated with the curve_original are all illustrated in solid lines in FIGS. 4M1-4N3b. On the other hand, the curve_fit, the various subdivisions of the curve_fit, and the BDs associated with the curve_fit are all illustrated in dotted lines in FIGS. 4M1-4N3b.

The method 336 then proceeds from 336e to 336f, where it is checked to determine if corresponding bounding boxes of the curve_original and curve_fit intersect. For example, referring to FIG. 4M2b, the BDs 462a1, 482a1 intersect with each other, and the BDs 462a2, 482a2 intersect with each other. Similarly, referring to FIG. 4N2b, the BDs 462a1, 492a1 intersect with each other, and the BDs 462a2, 492a2 intersect with each other. Thus, the block 336f generates an "Yes" for each of FIGS. 4M2b and 4N2b, during the first iteration of block 336f.

The method 336 then proceeds from 336f to 336g, where it is checked to determine if block 336e has been repeated for at least a threshold number of times, or if the BDs sufficiently small (e.g., smaller than a threshold size). The threshold number and/or the threshold size may be user configurable or implementation specific. If "No" at 336f, the method 336 loops back to 336e, where each of the curve_original and curve_fit is further divided.

For example, during a second iteration of block 336e, each of the curve_original 460 and curve_fit 480 is further divided in four subdivisions, as illustrated in FIG. 4M3a. Furthermore, BDs for each of the four subdivisions of curve_original 460 and curve_fit 480 are generated, as illustrated in FIG. 4M3b. Similarly, each of the curve_original 460 and curve_fit 490 is divided in four subdivisions, as illustrated in FIG. 4N3a. Furthermore, BDs for each of the four subdivisions of curve_original 460 and curve_fit 490 are generated, as illustrated in FIG. 4N3b.

During the second iteration of block 336f, it is determined that for the curve_fit 480 (which is subdivided in four divisions illustrated in FIG. 4M3a), each of the bounding boxes intersect with a corresponding bounding box of the curve_original 460, as illustrated in FIG. 4M3b.

However, during the second iteration of block 336f, it is determined that for the curve_fit 490 (which is subdivided in four divisions illustrated in FIG. 4N3a), there is at least one bounding box BD 492b3 does not intersect with a corresponding bounding box BD 462b3 of the curve_original 460, as illustrated in FIG. 4N3b.

Thus, for the example curve_fit 480 of FIGS. 4M1-4M3b, the decision block 336f outputs "Yes" during the second iteration of block 336f. However, for the example curve_fit 490 of FIGS. 4N1-4N3b, the decision block 336f outputs "No" during the second iteration of block 336f. Hence, the curve_fit 480 is found to be sufficiently similar to the curve_original 460 (e.g., with error due to the combination being less than a threshold). In contrast, the curve_fit 490 is found to be not sufficiently similar to the curve_original 460 (e.g., with error due to the combination being higher than the threshold).

Thus, for curve_fit 490 (i.e., if "No" at 336f), the method 336 proceeds to block 336i, which has been discussed herein earlier. For the curve_fit 480 (i.e., if "Yes" at 336f), the method 336 proceeds to block 336g, and eventually to block 336h. At 336h, the curve_original 460 (which comprises two underlying Bezier curves) is replaced by the single Bezier curve curve_fit 480. The method 336h then ends at 336k.

As illustrated in FIG. 3D, the blocks 336d, 336e, 336f, and 336g can be summarized as block 336L (illustrated using dotted line), which is to determine similarity between the curve_original and the curve_fit. If the curve_original and curve_fit are sufficiently similar, such as in the case of curve_fit 380 of FIGS. 3M1-3M3b, then the curve_original (which comprises two or more underlying Bezier curves) is replaced by the single Bezier curve curve_fit. On the other hand, if the curve_original and curve_fit are not sufficiently similar, such as in the case of curve_fit 390 of FIGS. 3N1-3N3b, then the curve_original is not replaced by the single Bezier curve curve_fit, and the method 336 is further iterated to see if a better fitting Bezier curve can be identified.

Figure 4O:
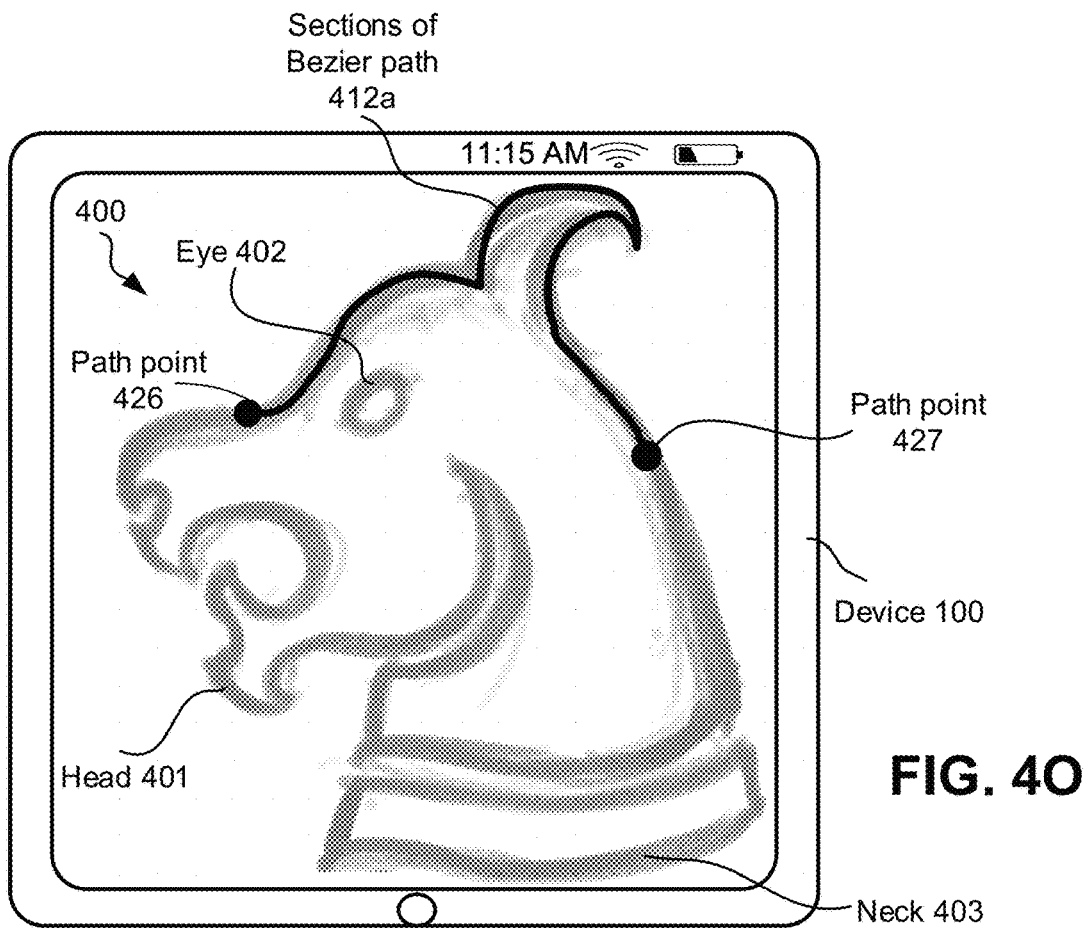

Thus, at the end of method 336, two or more Bezier curves may have been combined into a single Bezier curve (e.g., depending on the flow of method 336) within the subset. Referring again to FIG. 3A, the method 300 then proceeds from 336 to 340. At 340, the tracing module 120 causes display of the Bezier curves within the subset, without displaying one or more Bezier curves that are not within the subset, as illustrated in FIG. 4O. For example, only the Bezier curves, which are between path points 426, 427 and over the selected trace path 438a, are displayed. The displayed Bezier curves overlap and trace the edges of the top section of the head 401 of the raster image 400. Thus, the user 101 is able to trace a section of the edges of the raster image 400.

The method 300 then proceeds from 340 to 344, where a determination is made as to whether the tracing operation has ended. Such decision can be based on the user 101 closing a tracing application program. In another example, such decision can also be based on user starting another user gesture to trace another section of the raster image 400. If "Yes" at 344, i.e., if the tracing operation has ended, the method 300 ends at 348.

If "No" at 344, i.e., if the tracing operation has not ended, the system 102 waits until it detects another user input for another tracing operation (such as to expand the tracing of FIG. 4O). The method 300, thus, loops back to block 320 of the method 300.

Figure 4P:
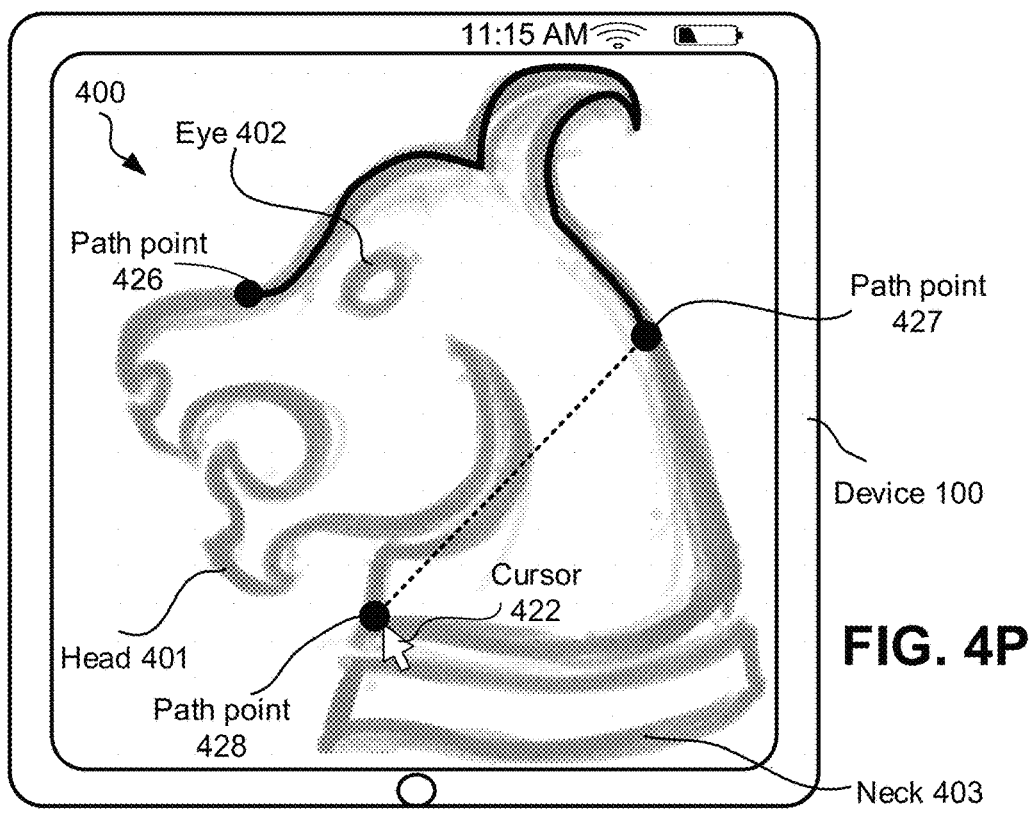
Figure 4Q:
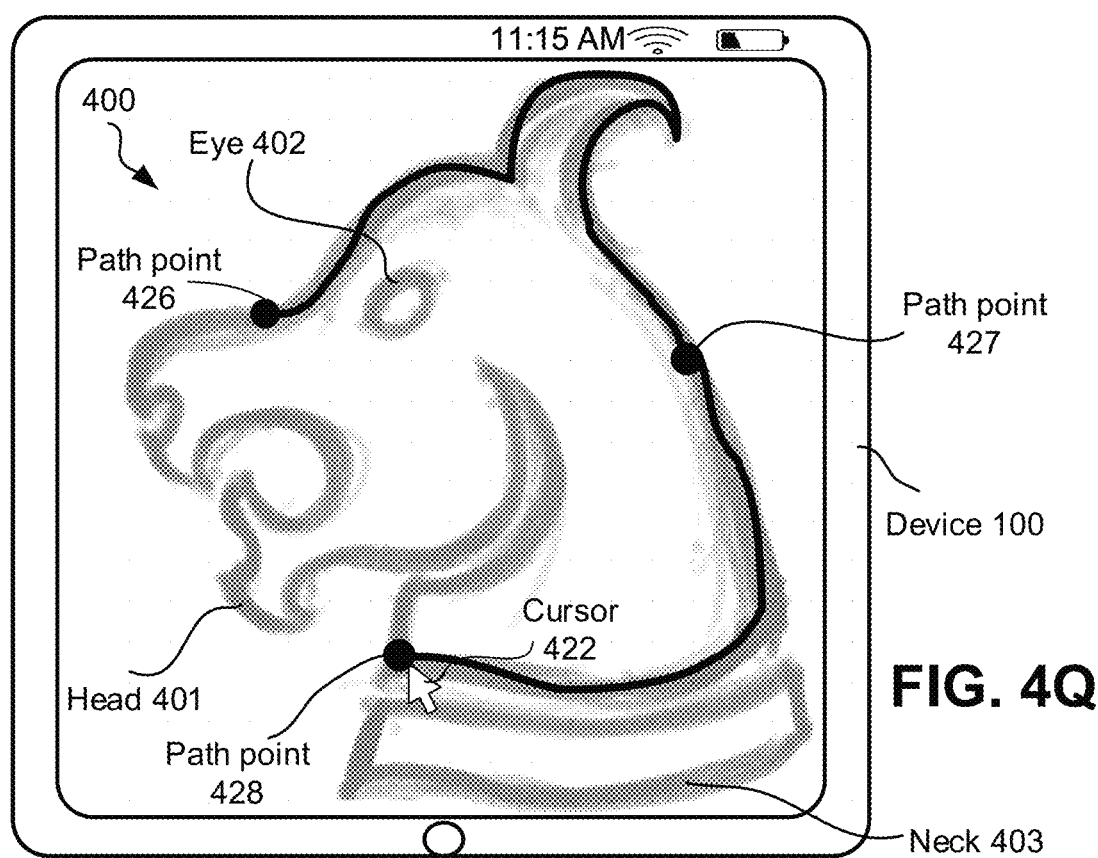

For example, during the second iteration of the method 300, the path point 427 may be identified based on initiation of the user gesture, and a path point 428 may be identified based on termination of the user gesture, as illustrated in FIG. 4P, and as discussed with respect to blocks 320 and 328 of the method 300. Accordingly, as illustrated in FIG. 4Q, Bezier curves between the path points 427, 428 are now displayed.

Thus, the user 101 is able to incrementally trace edges of the raster image 400. A section of an edge to be traced by the user 101 is easily selectable by the user 101. For example, the user 101 can select to trace only a section of the head 401 of the horse of the image 400, as illustrated in FIGS. 4O and 4Q. If the user 101 desires, she can complete tracing the entirety of the head 401. Thus, the user 101 controls the selection of the section of the edges that is to be traced.

Furthermore, the user identifies only a start point and an end point for the trace. The actual tracing operation between the start point and an end point is automatic, and is carried out without user input. This provides the user an opportunity to control an important aspect of tracing—i.e., selecting a section of the image to trace, while the actual tracing is automated and does not require the user to manually move a cursor 422 over the edges. Furthermore, the Bezier curves in the traced path can be simplified, by opportunistically combining two or more Bezier curves into a single curve, provided an error due to such combination is less than a threshold.

As discussed, the tracing can be applied to any type of raster images, for example, a photocopy or image of a hand-drawn sketch or a computer-generated sketch or drawing, a photograph, a video frame, a scanned document such as a bitmap, or any other type of raster image. As an example, FIGS. 4A-4Q discusses example use cases in which the tracing is applied to a raster image comprising a sketch. Furthermore, as illustrated in FIG. 5, a raster image comprising a photograph can also be depicted using an edge model, and hence, the subsequent tracing operations discussed herein can also be applied to raster images comprising photographs that have been converted to edge models.

Numerous variations and configurations will be apparent in light of this disclosure and the following examples.

Example 1. A method for tracing a vector image over at least a part of a raster image, the method comprising: identifying, within the raster image, one or more edges; generating an edge model comprising a vector image, the vector image including one or more Bezier curves that correspond to the one or more edges of the raster image; receiving a first user input indicating initiation of a user gesture for a trace operation, wherein the user gesture is initiated from a first gesture point on the raster image; identifying a first path point on the edge model that is closer to the first gesture point than one or more other points on the edge model; receiving a second user input indicating termination of the user gesture for the trace operation, wherein the user gesture is terminated on a second gesture point on the raster image; identifying a second path point on the edge model that is closer to the second gesture point than one or more other points on the edge model; identifying a subset of the plurality of Bezier curves that are between the first and second path points; and causing display over the raster image of one or more Bezier curves included in the subset, without displaying one or more Bezier curves that are not within the subset, wherein each of the Bezier curves included in the subset traces an edge of at least a section of the raster image between the first and second path points.

Example 2. The method of example 1, wherein identifying the subset of the plurality of Bezier curves comprises: identifying two or more trace paths on the edge model that are between the first and second path points; selecting a first trace path among the two or more trace paths; and identifying the subset of the plurality of Bezier curves that are between the first and second path points and that are on the selected first trace path.

Example 3. The method of example 2, wherein selecting the first trace path among the two or more trace paths comprises: determining, for each of the two or more trace paths, a corresponding length, such that two or more lengths corresponding to the two or more trace paths are determined; determining that a length of the first trace path is smallest among the determined two or more lengths; and selecting the first trace path among the two or more trace paths, in response to determining that the length of the first trace path is smallest among the determined two or more lengths.

Example 4. The method of any of examples 2-3, wherein selecting the first trace path among the two or more trace paths comprises: tracking a movement of a cursor from the first gesture point to the second gesture point, while the user gesture is being performed; determining that the cursor movement is proximal to the first trace path among the two or more trace paths; and selecting the first trace path among the two or more trace paths, in response to determining that the cursor movement is proximal to the first trace path.

Example 5. The method of any of examples 1-4, wherein identifying the first path point on the edge model comprises: projecting the first gesture point on a first point of a first edge of the edge model, such that the first point of the first edge is closer to the first gesture point than any other points of the first edge; projecting the first gesture point on a second point of a second edge of the edge model, such that the second point of the second edge is closer to the first gesture point than any other points of the second edge; determining a first projection distance between the first point and the first gesture point, and a second projection distance between the second point and the first gesture point; and in response to the first projection distance being smaller than the second projection distance, identifying the first point of the first edge of the edge model as the first path point.

Example 6. The method of any of examples 1-5, wherein the first point and the first gesture point overlap with one another, and wherein receiving the first user input indicating initiation of the user gesture comprises: detecting a cursor hovering within a threshold distance from an edge of the raster image; snapping the cursor to the first gesture point on the edge of the raster image, in response to the cursor hovering within the threshold distance from the edge of the raster image; and receiving the first user input indicating initiation of the user gesture from the first gesture point.

Example 7. The method of any of examples 1-6, wherein: the edge model comprises a plurality of Bezier paths that are disjoint from each other, each Bezier path including one or more corresponding Bezier curves; and the first path point and the second path point are on a first Bezier path.

Example 8. The method of example 7, further comprising: in response to receiving the first user input indicating initiation of the user gesture, identifying the first path point on the first Bezier path to be closest to the first gesture point than one or more other points on the edge model; and in response to identifying the first path point on the first Bezier path to be closest to the first gesture point, identifying the first Bezier path to be a primary Bezier path, wherein the subset of the plurality of Bezier curves between the first and second path points are on the primary Bezier path.

Example 9. The method of any of examples 1-8, wherein the user gesture is a first user gesture, wherein the subset is a first subset, and wherein the method further comprises: receiving a third user input indicating initiation of a second user gesture from a third gesture point; identifying a third path point on the edge model that is closer to the third gesture point than one or more other points on the edge model, the third path point being on a Bezier curve of the first subset; receiving a fourth user input indicating termination of the second user gesture on a fourth gesture point; identifying a fourth path point on the edge model that is closer to the fourth gesture point than one or more other points on the edge model; identifying a second subset of the plurality of Bezier curves that are between the second and fourth path points; and causing display of the first and second subsets of the plurality of Bezier curves, without displaying one or more Bezier curves that are not within the first and second subsets.

Example 10. The method of any of examples 1-9, wherein causing display of the subset of the plurality of Bezier curves comprises: combining two or more Bezier curves within the subset to generate a single Bezier curve, such that an error during combining is less than a threshold; replacing the two or more Bezier curves with the single Bezier curve in the subset of the plurality of Bezier curves; and subsequent to replacing the two or more Bezier curves with the single Bezier in the subset, causing display of the subset of the plurality of Bezier curves.

Example 11. The method of example 10, wherein combining the two or more Bezier curves within the subset to generate the single Bezier curve comprises: identifying, using a curve fitting algorithm, that the two or more Bezier curves are combinable to generate the single Bezier curve, wherein the two or more Bezier curves represent an original path and the single Bezier curve represents a modified path; dividing each of the original path and the modified path into multiple sections; for each section of the original path and for each section of the modified path, generating a corresponding bounding box; determining if each bounding box of the original path intersects with a corresponding bounding box of the modified path; and in response to determining that each bounding box of the original path intersects with a corresponding bounding box of the modified path, combining the two or more Bezier curves within the subset to generate the single Bezier curve.

Example 12. The method of any of examples 1-11, further comprising: subsequent to generating the edge model and prior to termination of the user gesture, refraining from displaying the vector image over the raster image.

Example 13. The method of any of examples 1-12, wherein the raster image is a bitmap or a photograph.

Example 14. A system for tracing a vector image over at least a part of a raster image, comprising: a memory; one or more processors; and an image tracing system executable by the one or more processors to identify edges of a plurality of objects within the raster image; generate a vector image comprising a plurality of Bezier paths, wherein each Bezier path corresponds to one or more corresponding edges of a corresponding object of the raster image, each Bezier path including one or more corresponding Bezier curves; identify, based on one or more user inputs, a first point to start a trace operation and a second point to end the trace operation, the first and second points on a Bezier path of the plurality of Bezier paths; select, from two or more possible trace paths between the first point and the second point on the Bezier path, a trace path, the selected trace path of the Bezier path comprising first one or more Bezier curves; and cause display over the raster image of the first one or more Bezier curves of the Bezier path, without displaying second one or more Bezier curves of the Bezier path that are not included in the first trace path.

Example 15. The system of example 14, wherein: the first point on the Bezier path is within a threshold distance from a first gesture point of a first user input; and the second point on the Bezier path is within the threshold distance from a second gesture point of a second user input.

Example 16. The system of example 15, wherein: the first user input is associated with an initiation of a user gesture; the second user input is associated with a termination of the user gesture; and the user gesture comprises one of a click-and-hold gesture, a press-and-hold gesture, or a tap-and-hold gesture.

Example 17. The system of any of examples 14-16, wherein the Bezier path is a first Bezier path, and wherein to receive indication of the first point on the Bezier path, the image tracing system is to: receive a first user input identifying a gesture point; project the gesture point to a plurality of Bezier paths, to generate a corresponding plurality of projection distances, where an individual projection distance corresponding to an individual Bezier path is a shortest distance between the gesture point and the individual Bezier path; determine that a minimum of the plurality of projection distances corresponds to the first Bezier path; and identify the first point to be a point on the first Bezier path where the gesture point is projected.

Example 18. The system of any of examples 14-17, wherein the first one or more Bezier curves comprises a plurality of Bezier curves, and wherein the image tracing system is further to: combine two or more Bezier curves of the plurality of Bezier curves to generate a single Bezier curve, wherein an error between the combination of the two or more Bezier curves and the single Bezier curve is less than a threshold; and causing display of the plurality of Bezier curves, with the two or more Bezier curves replaced by the single Bezier curve.

Example 19. A computer program product including one or more non-transitory machine-readable mediums encoded with instructions that when executed by one or more processors cause a process to be carried out for tracing a vector image over at least a part of a raster image, the process comprising: identifying, within the raster image, one or more edges; generating an edge model comprising a vector image, the vector image including one or more Bezier curves that correspond to the one or more edges of the raster image; receiving a first user input indicating initiation of a user gesture for a trace operation, wherein the user gesture is initiated from a first gesture point on the raster image; identifying a first path point on the edge model that is closer to the first gesture point than one or more other points on the edge model; receiving a second user input indicating termination of the user gesture for the trace operation, wherein the user gesture is terminated on a second gesture point on the raster image; identifying a second path point on the edge model that is closer to the second gesture point than one or more other points on the edge model; identifying a subset of the plurality of Bezier curves that are between the first and second path points; and causing display over the raster image of one or more Bezier curves included in the subset, without displaying one or more Bezier curves that are not within the subset, wherein each of the Bezier curves included in the subset traces an edge of at least a section of the raster image between the first and second path points.

Example 20. The computer program product of example 19, wherein identifying the subset of the plurality of Bezier curves comprises: identifying two or more trace paths on the edge model that are between the first and second path points; selecting a first trace path among the two or more trace paths; and identifying the subset of the plurality of Bezier curves that are between the first and second path points and that are on the selected first trace path.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system for tracing a vector image over at least a part of a raster image, comprising:
a memory;
one or more processors; and
an image tracing system executable by the one or more processors to identify edges of a plurality of objects within the raster image;
generate a vector image comprising a plurality of Bezier paths, wherein each Bezier path corresponds to one or more corresponding edges of a corresponding object of the raster image, each Bezier path including one or more corresponding Bezier curves;
identify, based on one or more user inputs, a first point to start a trace operation and a second point to end the trace operation, the first and second points on a Bezier path of the plurality of Bezier paths;
select, from two or more possible trace paths between the first point and the second point on the Bezier path, a trace path, the selected trace path of the Bezier path comprising first one or more Bezier curves; and
cause display over the raster image of the first one or more Bezier curves of the Bezier path, without displaying second one or more Bezier curves of the Bezier path that are not included in the first trace path.

2. The system of claim 1, wherein:
the first point on the Bezier path is within a threshold distance from a first gesture point of a first user input; and
the second point on the Bezier path is within the threshold distance from a second gesture point of a second user input.

3. The system of claim 2, wherein:
the first user input is associated with an initiation of a user gesture;
the second user input is associated with a termination of the user gesture; and
the user gesture comprises one of a click-and-hold gesture, a press-and-hold gesture, or a tap-and-hold gesture.

4. The system of claim 1, wherein the Bezier path is a first Bezier path, and wherein to receive indication of the first point on the Bezier path, the image tracing system is to:
receive a first user input identifying a gesture point;
project the gesture point to a plurality of Bezier paths, to generate a corresponding plurality of projection distances, where an individual projection distance corresponding to an individual Bezier path is a shortest distance between the gesture point and the individual Bezier path;
determine that a minimum of the plurality of projection distances corresponds to the first Bezier path; and
identify the first point to be a point on the first Bezier path where the gesture point is projected.

5. The system of claim 1, wherein the first one or more Bezier curves comprises a plurality of Bezier curves, and wherein the image tracing system is further to:
combine two or more Bezier curves of the plurality of Bezier curves to generate a single Bezier curve, wherein an error between the combination of the two or more Bezier curves and the single Bezier curve is less than a threshold; and
causing display of the plurality of Bezier curves, with the two or more Bezier curves replaced by the single Bezier curve.

6. A method for tracing over at least a part of a raster image, the method comprising:
identifying edges of a plurality of objects within the raster image;
generating a vector image comprising a plurality of Bezier paths, wherein each Bezier path corresponds to one or more corresponding edges of a corresponding object of the raster image, each Bezier path including one or more corresponding Bezier curves;
identifying, based on one or more user inputs, a first point to start a trace operation and a second point to end the trace operation, each of the first and second points on a particular one of the plurality of Bezier paths;
selecting, from two or more possible trace paths between the first point and the second point on the particular Bezier path, a selected trace path, the selected trace path of the particular Bezier path comprising a first set of one or more Bezier curves; and
causing display, over the raster image, of the first set of one or more Bezier curves of the particular Bezier path, without displaying a second set of one or more Bezier curves of the particular Bezier path that are not included in the selected trace path.

7. The method of claim 6, further comprising:
determining, for each of the two or more possible trace paths, a corresponding length, such that two or more lengths corresponding to the two or more possible trace paths are determined; and
determining that a length of the selected trace path is smallest among the determined two or more lengths.

8. The method of claim 6, wherein:
the first point on the particular Bezier path is within a threshold distance from a first gesture point of a first user input; and
the second point on the particular Bezier path is within the threshold distance from a second gesture point of a second user input.

9. The method of claim 8, wherein:
the first user input is associated with an initiation of a user gesture;
the second user input is associated with a termination of the user gesture; and
the user gesture comprises one of a click-and-hold gesture, a press-and-hold gesture, or a tap-and-hold gesture.

10. The method of claim 6, wherein:
the particular Bezier path is a first Bezier path; and
to receive indication of the first point on the particular Bezier path, the method further comprises:
receiving a first user input identifying a gesture point;
projecting the gesture point to one or more of the plurality of Bezier paths to generate a corresponding plurality of projection distances, where an individual projection distance corresponding to an individual Bezier path is a shortest distance between the gesture point and the individual Bezier path;
determining that a minimum of the plurality of projection distances corresponds to the first Bezier path; and
identifying the first point to be a point on the first Bezier path where the gesture point is projected.

11. The method of claim 6, wherein:
the one or more Bezier curves comprises a plurality of Bezier curves; and
the method further comprises:
combining two or more Bezier curves of the plurality of Bezier curves to generate a single Bezier curve, wherein an error between a combination of the two or more Bezier curves and the single Bezier curve is less than a threshold; and
causing display of the plurality of Bezier curves, with the two or more Bezier curves replaced by the single Bezier curve.

12. The method of claim 6, wherein selecting the selected trace path further comprises:
tracking a movement of a cursor from the first point to the second point during the trace operation; and
determining that the movement is proximal to the selected trace path among the two or more possible trace paths.

13. The method of claim 6, wherein the raster image is a bitmap or a photograph.

14. A computer program product including one or more non-transitory machine-readable mediums encoded with instructions that when executed by one or more processors cause a process to be carried out for tracing over at least a part of a raster image, the process comprising:
identifying edges of a plurality of objects within the raster image;
generating a vector image comprising a plurality of Bezier paths, wherein each Bezier path corresponds to one or more corresponding edges of a corresponding object of the raster image, each Bezier path including one or more corresponding Bezier curves;
identifying, based on one or more user inputs, a first point to start a trace operation and a second point to end the trace operation, each of the first and second points on a particular one of the plurality of Bezier paths;
selecting, from two or more possible trace paths between the first point and the second point on the particular Bezier path, a selected trace path, the selected trace path of the particular Bezier path comprising a first set of one or more Bezier curves; and
causing display, over the raster image, of the first set of one or more Bezier curves of the particular Bezier path, without displaying a second set of one or more Bezier curves of the particular Bezier path that are not included in the selected trace path.

15. The computer program product of claim 14, wherein the process further comprises:
determining, for each of the two or more possible trace paths, a corresponding length, such that two or more lengths corresponding to the two or more possible trace paths are determined; and
determining that a length of the selected trace path is smallest among the determined two or more lengths.

16. The computer program product of claim 14, wherein:
the first point on the particular Bezier path is within a threshold distance from a first gesture point of a first user input; and
the second point on the particular Bezier path is within the threshold distance from a second gesture point of a second user input.

17. The computer program product of claim 16, wherein:
the first user input is associated with an initiation of a user gesture;
the second user input is associated with a termination of the user gesture; and
the user gesture comprises one of a click-and-hold gesture, a press-and-hold gesture, or a tap-and-hold gesture.

18. The computer program product of claim 14, wherein:
the particular Bezier path is a first Bezier path; and
to receive indication of the first point on the particular Bezier path, the process further comprises:
receiving a first user input identifying a gesture point;
projecting the gesture point to one or more of the plurality of Bezier paths to generate a corresponding plurality of projection distances, where an individual projection distance corresponding to an individual Bezier path is a shortest distance between the gesture point and the individual Bezier path;
determining that a minimum of the plurality of projection distances corresponds to the first Bezier path; and
identifying the first point to be a point on the first Bezier path where the gesture point is projected.

19. The computer program product of claim 14, wherein:
the one or more Bezier curves comprises a plurality of Bezier curves; and
the process further comprises:
combining two or more Bezier curves of the plurality of Bezier curves to generate a single Bezier curve, wherein an error between a combination of the two or more Bezier curves and the single Bezier curve is less than a threshold; and causing display of the plurality of Bezier curves, with the two or more Bezier curves replaced by the single Bezier curve.

20. The computer program product of claim 14, wherein selecting the selected trace path further comprises:
   tracking a movement of a cursor from the first point to the second point during the trace operation; and
   determining that the movement is proximal to the selected trace path among the two or more possible trace paths.

\* \* \* \* \*